United States Patent
Adogla et al.

(10) Patent No.: US 12,541,355 B2
(45) Date of Patent: Feb. 3, 2026

(54) TECHNIQUES FOR IMAGE-BASED REGION BUILD

(71) Applicant: Oracle International Corporation, Redwood Shores, CA (US)

(72) Inventors: Eden Grail Adogla, Seattle, WA (US); Rajani Kanth Kolli, San Jose, CA (US); Pritesh Champalal Kothari, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 18/417,179

(22) Filed: Jan. 19, 2024

(65) Prior Publication Data

US 2025/0238217 A1    Jul. 24, 2025

(51) Int. Cl.
*G06F 8/61*      (2018.01)

(52) U.S. Cl.
CPC ..................................... *G06F 8/63* (2013.01)

(58) Field of Classification Search
CPC ........ G06F 8/63; G06F 9/5044; G06F 9/5077; H04L 41/12
See application file for complete search history.

(56) References Cited

U.S. PATENT DOCUMENTS

| | | | |
|---|---|---|---|
| 7,278,273 B1 | 10/2007 | Whitted et al. | |
| 7,590,623 B2 * | 9/2009 | Fellenstein | G06F 8/63 |
| 7,724,513 B2 | 5/2010 | Coglitore et al. | |
| 8,137,003 B2 | 3/2012 | Shannon et al. | |
| 8,143,521 B2 | 3/2012 | Burek et al. | |
| 8,737,090 B2 | 5/2014 | Jai | |
| 8,943,757 B2 | 2/2015 | Parizeau et al. | |

(Continued)

FOREIGN PATENT DOCUMENTS

| | | | |
|---|---|---|---|
| CN | 105227686 A | 1/2016 | |
| CN | 106535548 A | 3/2017 | |

(Continued)

OTHER PUBLICATIONS

7220 Interconnect Router for Data Center Fabric, Nokia, Available Online at: https://www.nokia.com/networks/data-center/data-center-fabric/7220-interconnect-router/, Accessed from Internet on May 20, 2022, 3 pages.

(Continued)

*Primary Examiner* — Marina Lee
(74) *Attorney, Agent, or Firm* — Kilpatrick Townsend & Stockton LLP

(57) ABSTRACT

Techniques are disclosed for building a region data center using image-based resource deployment. A manager service executing in a distributed computing system can deploy software resources to a first set of physical resources within a data center and generate an image set for the first set of physical resources. The image set can include a software image corresponding to each physical resource in the first set of physical resources. The manager service can also determine whether a second set of physical resources is compatible with the image set and deploy the image set to the second set of physical resources. The manager service can then configure identifiers associated with the software resources of the image set deployed to the second set of physical resources.

20 Claims, 13 Drawing Sheets

(56) References Cited

U.S. PATENT DOCUMENTS

| | | | |
|---|---|---|---|
| 9,426,036 B1 | 8/2016 | Roy | |
| 9,584,373 B2 | 2/2017 | Schlansker et al. | |
| 9,603,281 B2 | 3/2017 | Crosby, Jr. | |
| 9,813,302 B2 | 11/2017 | Curtis et al. | |
| 9,946,034 B1 | 4/2018 | Eslick et al. | |
| 10,205,701 B1 | 2/2019 | Voss et al. | |
| 10,243,785 B1 | 3/2019 | Corrigan et al. | |
| 10,243,790 B2 | 3/2019 | Galliher, III et al. | |
| 10,420,248 B1 | 9/2019 | Yu et al. | |
| 10,674,625 B1 | 6/2020 | Leung et al. | |
| 10,819,677 B2 | 10/2020 | Goelitz et al. | |
| 10,880,218 B2 | 12/2020 | Radlein et al. | |
| 10,905,025 B1 | 1/2021 | Thomas et al. | |
| 10,965,525 B1 | 3/2021 | Frink et al. | |
| 11,006,001 B1 | 5/2021 | Britt et al. | |
| 11,301,407 B2 | 4/2022 | Sen et al. | |
| 11,316,822 B1 | 4/2022 | Gawade et al. | |
| 11,438,393 B1 | 9/2022 | Tribble et al. | |
| 11,451,447 B1 | 9/2022 | Jangam et al. | |
| 11,496,364 B1 | 11/2022 | Mellquist et al. | |
| 11,595,347 B1 | 2/2023 | Shevade et al. | |
| 11,824,735 B1 | 11/2023 | Prateek et al. | |
| 11,853,802 B1 | 12/2023 | Wei et al. | |
| 12,015,722 B2 | 6/2024 | Jain et al. | |
| 12,095,734 B1 | 9/2024 | Engskow et al. | |
| 12,327,127 B2 * | 6/2025 | Adogla | G06F 9/5077 |
| 2004/0228290 A1 | 11/2004 | Graves | |
| 2008/0314979 A1 | 12/2008 | Johnsen et al. | |
| 2009/0198388 A1 | 8/2009 | Hillis | |
| 2009/0216920 A1 | 8/2009 | Lauterbach et al. | |
| 2011/0154320 A1 | 6/2011 | Verma | |
| 2012/0110055 A1 | 5/2012 | Van Biljon et al. | |
| 2012/0155027 A1 | 6/2012 | Broome et al. | |
| 2012/0317261 A1 | 12/2012 | Ahmavaara | |
| 2013/0007710 A1 | 1/2013 | Vedula et al. | |
| 2014/0082164 A1 | 3/2014 | Niemoller et al. | |
| 2014/0314099 A1 | 10/2014 | Dress | |
| 2015/0156122 A1 | 6/2015 | Singh et al. | |
| 2015/0248338 A1 | 9/2015 | Klein et al. | |
| 2016/0248726 A1 | 8/2016 | Kolesnik et al. | |
| 2016/0248732 A1 | 8/2016 | Kolesnik et al. | |
| 2017/0026226 A1 | 1/2017 | Grussling et al. | |
| 2017/0104637 A1 | 4/2017 | Gianrossi et al. | |
| 2017/0111389 A1 | 4/2017 | Kasman et al. | |
| 2017/0163560 A1 | 6/2017 | Siemssen | |
| 2017/0208140 A1 | 7/2017 | Choi et al. | |
| 2017/0344584 A1 | 11/2017 | Parappalliyalil et al. | |
| 2017/0374088 A1 | 12/2017 | Pappu et al. | |
| 2018/0123890 A1 * | 5/2018 | Merk | H04L 41/0803 |
| 2018/0152503 A1 | 5/2018 | Holgers et al. | |
| 2018/0176130 A1 | 6/2018 | Banerjee et al. | |
| 2018/0234407 A1 | 8/2018 | Li et al. | |
| 2019/0182207 A1 | 6/2019 | Tsirkin | |
| 2019/0208290 A1 | 7/2019 | Olson et al. | |
| 2019/0213044 A1 | 7/2019 | Cui et al. | |
| 2019/0235851 A1 | 8/2019 | Vergara | |
| 2019/0238498 A1 | 8/2019 | Cleary et al. | |
| 2019/0253410 A1 | 8/2019 | Joyner et al. | |
| 2020/0021556 A1 | 1/2020 | Goelitz et al. | |
| 2020/0106669 A1 | 4/2020 | Dhillon et al. | |
| 2020/0153740 A1 | 5/2020 | Singh et al. | |
| 2020/0162317 A1 | 5/2020 | Devireddy | |
| 2020/0205310 A1 | 6/2020 | Rogers | |
| 2021/0119960 A1 | 4/2021 | Sinha et al. | |
| 2021/0392041 A1 | 12/2021 | Ranjan et al. | |
| 2022/0024048 A1 | 1/2022 | Ambrus et al. | |
| 2022/0029794 A1 | 1/2022 | Malhotra et al. | |
| 2022/0158975 A1 | 5/2022 | Brecl et al. | |
| 2022/0191163 A1 | 6/2022 | Loefstrand et al. | |
| 2022/0217057 A1 | 7/2022 | Schumaker | |
| 2022/0385623 A1 | 12/2022 | Henry et al. | |
| 2022/0398118 A1 | 12/2022 | Akula et al. | |
| 2023/0018535 A1 | 1/2023 | Chawla et al. | |
| 2023/0086281 A1 | 3/2023 | Kaidi | |
| 2023/0108661 A1 | 4/2023 | Adogla et al. | |
| 2023/0153094 A1 | 5/2023 | Cain, Jr. et al. | |
| 2023/0254287 A1 | 8/2023 | Belleau | |
| 2023/0385228 A1 | 11/2023 | Olson et al. | |
| 2023/0396590 A1 | 12/2023 | Adogla | |
| 2024/0015136 A1 | 1/2024 | Asveren et al. | |
| 2024/0020175 A1 | 1/2024 | Barsalou et al. | |
| 2024/0022542 A1 | 1/2024 | Liu et al. | |
| 2024/0097918 A1 | 3/2024 | Sharma et al. | |
| 2024/0098504 A1 | 3/2024 | Demonget et al. | |
| 2024/0129317 A1 | 4/2024 | Addaguduru et al. | |
| 2024/0388567 A1 | 11/2024 | Brecl et al. | |

FOREIGN PATENT DOCUMENTS

| | | |
|---|---|---|
| CN | 112188788 A | 1/2021 |
| CN | 113873053 A | 12/2021 |
| CN | 215526574 U | 1/2022 |
| EP | 2854080 A1 | 4/2015 |
| EP | 3275143 B1 | 12/2019 |
| WO | 2009109684 A1 | 9/2009 |
| WO | 2019191401 A1 | 10/2019 |
| WO | 2020018582 A1 | 1/2020 |
| WO | 2023154680 A1 | 8/2023 |

OTHER PUBLICATIONS

90 KW, Tier II, Direct Expansion, 142.1 m2, All-In-One Prefab Data Center Module—Busway or PDU, Schneider Electric, Available Online at: https://download.schneider-electric.com/files?p_Doc_Ref=RD84DSR2_EN, Sep. 2018, pp. 1-7.

Adding or Changing Name Servers and Glue Records for a Domain, Available online at: https://docs.aws.amazon.com/Route53/latest/DeveloperGuide/domain-name-servers-glue-records.html, Accessed from Internet May 2, 2022, 5 pages.

All-in-One Container, Schneider Electric India, Available Online at: https://www.se.com/in/en/product-range/62320-allinone-container/?parent-subcategory-id=7570#overview, Accessed from Internet on May 3, 2022, 3 pages.

Cable and Pipe Seals for Data Centers, Roxtec, Available Online at: https://www.roxtec.com/uk/industries/infrastructure/data-centers/, Accessed from Internet on May 20, 2022, 14 pages.

Cable Management for Data Centres, Etech Components, Available Online at: https://etechcomponents.com/cable-management-for-data-centres/, Dec. 10, 2021, 8 pages.

Cable Trough System, Etech Components, Available Online at: https://etechcomponents.com/product_categories/cable-trough-system/?cn-reloaded=1, Accessed from Internet on May 20, 2022, 8 pages.

Cisco ACI Multi-Site Architecture: White Paper, Available Online at: https://www.cisco.com/c/en/us/solutions/collateral/data-center-virtualization/application-centric-infrastructure/white-paper-c11-739609.html, 2021, pp. 1-140.

Cisco UCS 6400 Series Fabric Interconnects, Data Sheet, Cisco Public, Available Online at: https://www.cisco.com/c/en/us/products/collateral/servers-unified-computing/datasheet-c78-741116.html, Accessed from Internet on May 3, 2022, 5 pages.

Cisco UCS Fabric Interconnects and Fabric Extenders, Cisco, Available Online at: https://www.cisco.com/c/en/us/products/servers-unified-computing/fabric-interconnects.html, Accessed from Internet on May 3, 2022, 2 pages.

Configure a Custom Domain Name For your Azure API Management Instance, Available online at: https://docs.microsoft.com/en-us/azure/api-management/configure-custom-domain?tabs=custom, Apr. 28, 2022, 8 pages.

Configuring DNS Server Settings for a Data Center, Available online at: https://sort.veritas.com/public/documents/ITRP/1.0/windowsandunix/productguides/html/deployment/ch06s07s01.htm, Accessed from Internet May 2, 2022, 2 pages.

Creating an Edge-Optimized Custom Domain Name, Available online at: https://docs.aws.amazon.com/apigateway/latest/developerguide/how-to-edge-optimized-custom-domain-name.html, Accessed from Internet May 2, 2022, 7 pages.

(56) References Cited

OTHER PUBLICATIONS

Data Center Manager, Honeywell Building Technologies, Available Online at: https://buildings.honeywell.com/us/en/industries/data-centers/honeywell_data_center_manager, Accessed from Internet on May 20, 2022, 5 pages.

Data Center Solutions and Networks Schneider Electric India, Available Online at: https://www.se.com/in/en/work/solutions/for-business/data-centers-and-networks/, Accessed from Internet on May 20, 2022, 7 pages.

Data Centers, Honeywell Building Technologies, Available Online at: https://buildings.honeywell.com/us/en/industries/data-centers, Accessed from Internet on May 20, 2022, 5 pages.

Data Centers: Our Controls, Aws, Available Online at: https://aws.amazon.com/compliance/data-center/controls/, Accessed from Internet on May 20, 2022, pp. 1-8.

EcoStruxure Data Center Reference Designs, Schneider Electric Global, Available Online at: https://www.se.com/ww/en/work/solutions/for-business/data-centers-and-networks/reference-designs/, Accessed from Internet on May 20, 2022, pp. 1-5.

EcoStruxure Data Centre Solutions, Schneider Electric India, Available Online at: https://www.se.com/in/en/work/products/master-ranges/ecostruxure-data-center-solutions/, Accessed from Internet on May 20, 2022, pp. 1-6.

EcoStruxure IT, Schneider Electric, Available Online at: https://ecostruxureit.com/, Accessed from Internet on May 20, 2022, 4 pages.

FusionDC1000A Prefabricated All-In-One Data Center, Huawei Enterprise, Available Online at: https://e.huawei.com/in/products/network-energy/dc-facilities/ids1000-a, Accessed from Internet on May 20, 2022, 6 pages.

FusionDC1000B Prefabricated Modular Data Center (Small- and Medium-Sized), Huawei Enterprise, Available Online at: https://e.huawei.com/in/products/network-energy/dc-facilities/ids1000-b, Accessed from Internet on May 5, 2022, pp. 1-5.

Hybrid Cloud Data Center, International Business Machines, Available Online at: https://www.ibm.com/za-en/services/business-continuity/data-center, Accessed from Internet on May 20, 2022, pp. 1-7.

IBM Cloud Foundry Migration Runtime UI SSL Certificate Update and Rotation, Available online at: https://www.ibm.com/docs/en/cfmr?topic=guide-ssl-certificate-update-rotation, Sep. 17, 2021, 2 pages.

IManager NetEco6000 DCIM+ Solution, Huawei Enterprise, Available Online at: https://e.huawei.com/in/products/network-energy/dc-facilities/neteco6000, Accessed from Internet on May 5, 2022, 3 pages.

Introducing the Microsoft Azure Modular Datacenter, Available Online at: https://azure.microsoft.com/en-in/blog/introducing-the-microsoft-azure-modular-datacenter/, Oct. 20, 2020, 6 pages.

Is It Possible to Have One SSL Certificate for Multiple Domains, Available online at: https://sectigostore.com/page/one-ssl-certificate-for-multiple-domains/, Accessed from Internet May 2, 2022, 7 pages.

ManageOne Data Center Management, Available Online at: https://carrier.huawei.com/en/products/IT/cloud-computing/manageone, Accessed from Internet on May 20, 2022, pp. 1-3.

Managing Google EKM Endpoints, Available online at: https://thalesdocs.com/ctp/cm/2.7/admin/cckm_ag/ekm/managing_ekm_endpoints/index.html, Accessed from Internet May 2, 2022, 12 pages.

Mobile Data Center, CONTEG, Available Online at: https://www.conteg.com/mobile-data-center, Accessed from Internet on May 20, 2022, 4 pages.

Modular Data Centers for Efficient Operations, Schneider Electric Indian, Available Online at: https://www.se.com/in/en/work/solutions/for-business/data-centers-and-networks/modular/, Accessed from Internet on May 20, 2022, pp. 1-8.

Modular Datacenter Overview, Available Online at: https://docs.microsoft.com/en-us/azure-stack/mdc/mdc-overview, Mar. 1, 2022, 4 pages.

Multiple SSL Certificates for a Single Domain on Different Servers, Server Fault, Available online at: https://serverfault.com/questions/525581/multiple-ssl-certificates-for-a-single-domain-on-different-servers, Accessed from Internet May 2, 2022, 3 pages.

Next-Generation Data Center Interconnect Powered by the Pluribus Adaptive Cloud Fabric, Pluribus Networks, Available Online at: https://i.dell.com/sites/csdocuments/Product_Docs/en/dell-pluribus-nextgen-dci-so-042518.pdf, Accessed from Internet on May 20, 2022, pp. 1-5.

Prefabricated Data Center, Vertiv, Available Online at: https://www.vertiv.com/en-asia/solutions/prefabricated-data-center/, Accessed from Internet on May 20, 2022, pp. 1-8.

Prefabricated Data Center Brochure, Available Online at: https://www.vertiv.com/4994d7/globalassets/shared/vertiv-prefabricated-data-center-brochure.pdf, Accessed from Internet on May 20, 2022, 12 pages.

Prefabricated Data Center: Integral Systems Test Service for IT Module, Schneider Electric Services, Available Online at: https://www.se.com/in/en/download/document/SPD_SSAO-A3VLV3_EN, Oct. 16, 2017, 2 pages.

Prefabricated Modular & Mobile Data Centre, Available Online at: https://www.mobiledatacentre.com/prefabrication-construction-applications/mobile-data-centre/, Accessed from Internet on May 20, 2022, 5 pages.

Prefabricated Modular Data Center—Add Data Center Capacity Where and When You Need It, IBM Global Technology Services, Available Online at: https://www.ibm.com/downloads/cas/YXKNDQAO, Sep. 2014, 12 pages.

Ramos Plus, CONTEG, Available Online at: https://www.conteg.com/products/ramos-plus, Accessed from Internet on May 20, 2022, 15 pages.

Redirecting Old Domain to New Domain—Google SSL Warning, Available online at: https://webmasters.stackexchange.com/questions/133635/redirecting-old-domain-to-new-domain-google-ssl-warning, Accessed from Internet May 2, 2022, 3 pages.

Schneider 3D Pre Fab Structure Tour, Available Online at: https://apps.kaonadn.net/6819002/SchneiderPrefab/index.html, Accessed from Internet on May 20, 2022, 1 page.

Schneider Electric EcoStruxureTM Modular Data Centers, Schneider Electric, Available Online at: https://download.schneider-electric.com/files?p_enDocType=Catalog&p_File_Name=EcoStruxure+Modular+Data+Centers+Brochure+ROW+Rev+4.pdf&p_Doc_Ref=Modular_Overview_Catalog_EN, Accessed from Internet on May 20, 2022, 2 pages.

Transform Maintenance into Uptime Strategy, Available Online at: https://buildings.honeywell.com/content/dam/hbtbt/en/documents/downloads/HW-BR-DigitizedMaintenance.pdf, 2021, 4 pages.

Transforming Data Centers into Open Interconnection Fabrics, DataCenter News, Available Online at: https://datacenternews.asia/story/transforming-data-centers-open-interconnection-fabrics, Mar. 10, 2017, pp. 1-3.

What is a Data Center Fabric?, Juniper Networks, Available Online at: https://www.juniper.net/us/en/research-topics/what-is-data-center-fabric.html, Accessed from Internet on May 3, 2022, 4 pages.

Your Data Center Your Rules, Honeywell Data Center Manager, Available Online at: https://buildings.honeywell.com/content/dam/hbtbt/en/documents/downloads/Honeywell-Data-Center-Manager-BR.pdf, 2021, 4 pages.

Andreyev, Introducing Data Center Fabric, the Next-Generation Facebook Data Center Network, Data Center Engineering, Networking & Traffic, Production Engineering, Available Online at: https://engineering.fb.com/2014/11/14/production-engineering/introducing-data-center-fabric-the-next-generation-facebook-data-center-network/, Nov. 14, 2014, 10 pages.

Andreyev et al., Reinventing Facebook's Data Center Network, Data Center Engineering, Networking & Traffic, Available Online at: https://engineering.fb.com/2019/03/14/data-center-engineering/f16-minipack/, Mar. 14, 2019, 18 pages.

Dementyev et al., Zero Downtime Rebranding—Martian Chronicles, Evil Martians' Team Blog, Available Online at: https://evilmartians.com/chronicles/zero-downtime-rebranding, Nov. 27, 2017, 14 pages.

Gao et al., DRAF: A Low-Power DRAM-Based Reconfigurable Acceleration Fabric, ACM SIGARCH Computer Architecture News,

(56) References Cited

OTHER PUBLICATIONS vol. 44, No. 3, Available Online at: https://dl.acm.org/doi/pdf/10.1145/3007787.3001191, Jun. 18, 2016, pp. 506-518.
International Application No. PCT/US2024/020248, International Search Report and Written Opinion mailed on Jul. 5, 2024, 12 pages.
International Application No. PCT/US2024/020250, International Search Report and Written Opinion mailed on Jun. 26, 2024, 12 pages.
International Application No. PCT/US2024/020255, International Search Report and Written Opinion mailed on Jul. 3, 2024, 12 pages.
International Application No. PCT/US2024/020258, Invitation to Pay Additional Fees and, Where Applicable, Protest Fee mailed on Jul. 3, 2024, 8 pages.
International Application No. PCT/US2024/020261, International Search Report and Written Opinion mailed on Jul. 3, 2024, 11 pages.
Yirka, Microsoft Debuts Portable Data Center to Bring Cloud Computing to Remote Environments, TechXplore, Available Online at: https://techxplore.com/pdf522492993.pdf, Oct. 21, 2020, 2 pages.
U.S. Appl. No. 18/122,674, Non-Final Office Action mailed on Feb. 25, 2025, 17 pages.
U.S. Appl. No. 18/122,675, Notice of Allowance mailed on Jun. 4, 2025, 17 pages.
U.S. Appl. No. 18/122,676, Non-Final Office Action mailed on Jun. 23, 2025, 34 pages.
U.S. Appl. No. 18/122,677, Non-Final Office Action mailed on Dec. 19, 2024, 15 pages.
U.S. Appl. No. 18/215,632, Non-Final Office Action mailed on Mar. 24, 2025, 18 pages.
U.S. Appl. No. 18/382,885, Final Office Action mailed on Jun. 2, 2025, 10 pages.
U.S. Appl. No. 18/382,885, Non-Final Office Action mailed on Dec. 18, 2024, 17 pages.
U.S. Appl. No. 18/520,510, Notice of Allowance mailed on Apr. 21, 2025, 17 pages.
Mastenbroek et al., OpenDC 2.0: Convenient Modeling and Simulation of Emerging Technologies in Cloud Datacenters, Institute of Electrical and Electronics Engineers/Association for Computing Machinery 21st International Symposium on Cluster, Cloud and Internet Computing, May 10, 2021, 10 pages.
International Application No. PCT/US2024/020258, International Search Report and Written Opinion mailed on Aug. 26, 2024, 16 pages.
International Application No. PCT/US2024/035410, International Search Report and Written Opinion mailed on Oct. 7, 2024, 23 pages.
International Application No. PCT/US2024/056694, International Search Report and Written Opinion mailed on Feb. 11, 2025, 16 pages.
International Application No. PCT/US2025/011497, International Search Report and Written Opinion mailed on Apr. 22, 2025, 12 pages.

\* cited by examiner

TECHNIQUES FOR IMAGE-BASED REGION BUILD

CROSS REFERENCES TO RELATED APPLICATIONS

The present application is related to the following applications, the entire contents of which are incorporated herein by reference for all purposes:
(1) U.S. Non-Provisional application Ser. No. 18/122,674 filed on Mar. 16, 2023, entitled "TECHNIQUES FOR BUILDING CLOUD REGIONS AT A PREFAB FACTORY,";
(2) U.S. Non-Provisional application Ser. No. 18/122,675, filed on Mar. 16, 2023, entitled "TECHNIQUES FOR VALIDATING CLOUD REGIONS BUILT AT A PREFAB FACTORY,";
(3) U.S. Non-Provisional application Ser. No. 18/215,632, filed on Jun. 28, 2023, entitled "TECHNIQUES FOR ROTATING NETWORK ADDRESSES IN PREFAB REGIONS,"; and
(4) U.S. Non-Provisional application Ser. No. 18/382,885, filed on Oct. 23, 2023, entitled "TECHNIQUES FOR ROTATING SERVICE ENDPOINTS IN PREFAB REGIONS,"
(5) U.S. Non-Provisional application Ser. No. 18/520,510, filed on Nov. 27, 2023, entitled "TECHNIQUES FOR ROTATING RESOURCE IDENTIFIERS IN PREFAB REGIONS,"

BACKGROUND

A cloud infrastructure provider may operate one or more data centers in geographic areas around the world. A "region" is a logical abstraction around a collection of the computing, storage, and networking resources of the data centers of a given geographical area that are used to provide the cloud computing infrastructure. Building new regions can include provisioning the computing resources, configuring infrastructure, and deploying code to those resources, typically over network connections to the data centers. However, building regions with physical resources located at the final destination data center sites requires significant preparation work at the data centers that can complicate the logistics and scheduling of completing the building of a region.

BRIEF SUMMARY

Embodiments of the present disclosure relate to automatically building a region using a prefab factory. A prefab factory may be a facility dedicated to configuring computing devices, networking devices, and other physical resources for delivery to a destination site (e.g., a destination region—one or more data centers in a geographic area, a customer facility, etc.). Operations for building a region can include bootstrapping (e.g., provisioning and/or deploying) resources (e.g., infrastructure components, artifacts, etc.) for any suitable number of services available from the region when delivered to the destination. Once the physical resources have been configured at the prefab factory, they may be shipped to the destination site, installed at the destination data center, and have final configurations and other software resources deployed to the physical resources. Resources used for bootstrapping (e.g., software artifacts, software images, etc.) may be provided in a bootstrapping environment in an existing region (e.g., one or more data centers of a host region). The host region can be selected based on network proximity to the prefab factory, and in a complimentary fashion, the prefab factory may be sited to have high performance network connectivity to one or more host regions to support the bootstrapping environment. Building the region may be orchestrated by one or more cloud-based services that can manage the inventory of physical computing devices used to build regions in the prefab factory, generate and specify the configurations of regions to be built in the prefab factory, manage the bootstrapping of the regions, configure the regions for transmission to a destination site, and test and verify the physical resources after the physical resources have been installed at the destination site. A prefab region may be built to meet a specific customer's configuration preferences (built-to-order) or built to a common specification that may be further customized during installation at a specific customer's site (built-to-stock).

One embodiment is directed to a computer-implemented method for performing image-based deployment to a region network at a prefab factory or at a destination site. The method can be performed by a manager service executing on one or more computing devices of a distributed computing system that hosts a region network. The method can include deploying software resources to a first set of physical resources within a data center. The first set of physical resources can be characterized by a first network topology and a first hardware configuration. The method can also include generating an image set for the first set of physical resources. The image set can include a software image corresponding to each physical resource in the first set of physical resources, and each software image can include at least one software resource deployed to the first set of physical resources. The method can also include the manager service determining whether a second set of physical resources is compatible with the image set, and if so, deploying the image set to the second set of physical resources. The second set of physical resources can be characterized by a second network topology and a second hardware configuration. The method can also include the manager service configuring identifiers associated with the software resources of the image set deployed to the second set of physical resources.

Another embodiment is directed to a distributed computing system comprising one or more processors and instructions that, when executed by the one or more processors, cause the distributed computing system to perform the method described above.

Still another embodiment is directed to a non-transitory computer-readable medium storing computer-executable instructions that, when executed by one or more processors of a distributed computing system, cause the distributed computing system to perform the method described above.

BRIEF DESCRIPTION OF DRAWINGS

To easily identify the discussion of any particular element or act, the most significant digit or digits in a reference number refer to the figure number in which that element is first introduced.

DETAILED DESCRIPTION

Figure 1:
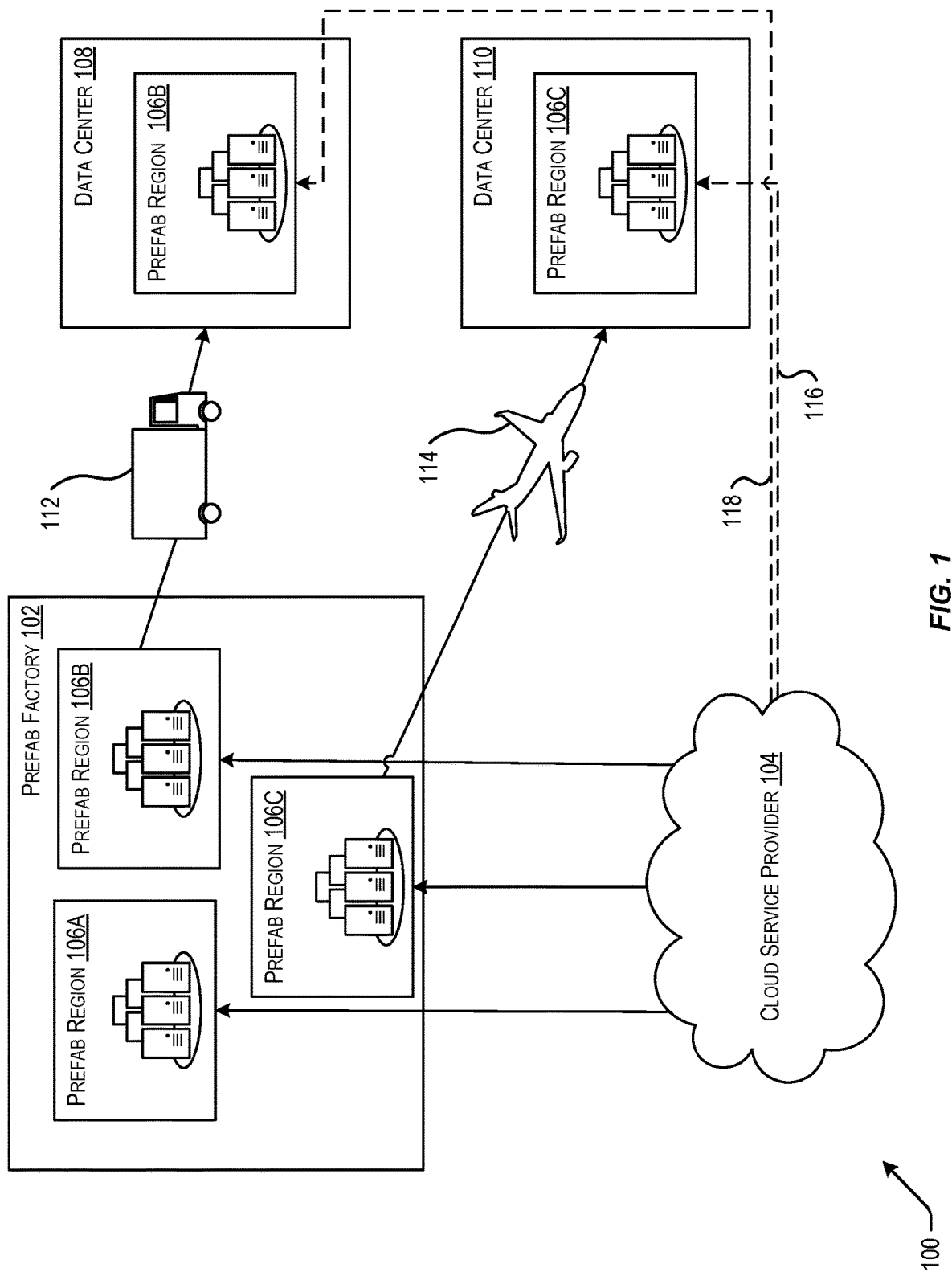
FIG. 1 is a block diagram illustrating a prefab factory for building regions and preparing the region computing devices for transmission to target data centers, according to at least one embodiment.

Example Automated Data Center Build (Region Build) Infrastructure

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure, and which are used to provide a cloud service to a customer, are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, a government entity, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors, bare-metal computers), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center leads to shorter latency resulting in more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers)) and configuring it to provide cloud services in a region is sometimes also referred to as building a region. The term "region build" is used to refer to building one or more data centers in a region. Building a region involves provisioning or creating a set of new resources that are needed or used for providing a set of services that the data center is configured to provide. The end result of the region build process is the creation of a region, where the data center, together with the contained hardware and software resources, is capable of providing a set of services intended for that region and includes a set of resources that are used to provide the set of services.

Building a new region is a very complex activity requiring extensive coordination between various bootstrapping activities. At a high level, this involves the performance and coordination of various tasks such as: identifying the set of services to be provided by the data center; identifying various resources that are needed for providing the set of services; creating, provisioning, and deploying the identified resources; wiring the underlying hardware properly so that they can be used in an intended manner; and the like. Each of these tasks further have subtasks that need to be coordinated, further adding to the complexity. Due to this complexity, presently, the building of a region involves several manually initiated or manually controlled tasks that require careful manual coordination. As a result, the task of building a new region (i.e., building one or more data centers in a region and configuring the hardware and software in each data center to provide the requisite cloud services) is very time consuming. It can take time, for example many months, to build a region. Additionally, the process is very error prone, sometimes requiring several iterations before a desired configuration of the region is achieved, which further adds to the time taken to build a region (e.g., deploy hardware and software resources). These limitations and problems severely limit a CSP's ability to grow computing resources in a timely manner responsive to increasing customer needs.

Recent innovations allow CSPs to reduce build time, reduce computing resource waste, and reduce risk related to building a region. A CSP may employ an orchestration service to bootstrap services into a new region. The orchestration service may be a cloud-based service hosted within a separate region (e.g., an orchestration region) from the target region. To bootstrap services into the target region, the orchestration service can create a bootstrapping environment to host instances of one or more cloud services. The orchestration service can then use the services in the bootstrapping environment to support the deployment of services into the target region.

Even more recent innovations allow CSPs to centralize the region build operations to one or more facilities that can act as "factories" to produce partially or fully configured physical infrastructure for subsequent delivery to a destination site. Instead of waiting for the construction of a target region data center and the installation of physical components (e.g., servers, network switches, power supply, etc.) at the data center before bootstrapping the services into the target region, a CSP can build regions in a prefab factory, ship the configured physical components, like racks, to the destination data center, and then finalize and verify the components of the region once the racks arrive at the destination site. The prefab factory is capable of building multiple regions simultaneously. Each region being built at the prefab factory can have separate configurations, network topologies, and services. By building the regions at a prefab factory, the complexity of scheduling and logistics related to preparing the destination facility, delivering physical components to the destination facility, and managing bootstrapping resources within the cloud services can be greatly reduced, since the regions can be built in advance and maintained until the destination site is ready.

A prefab factory can also be used to build computing components to be integrated into on-premises solutions for customers, for example, when the customer controls and manages its own data center environment.

The present disclosure is directed to a prefab factory in which automated region builds are performed using one or more prefab services. A prefab manager service can orchestrate the overall building of a region at the prefab factory. The manager service can work in conjunction with the one or more additional prefab services to manage the inventory of physical components used to construct the region at the prefab factory, configure the network (e.g., endpoints, network topology, addresses and/or other identifiers of the components within the region), bootstrapping services onto the region infrastructure, preparing the components for transmission of the region (including encrypting data volumes to provide security during transit), verifying the region after delivery to and installation at the destination site, and finalizing the configuration of the region, including performing any remaining bootstrapping or updating operations for the services deployed to the region infrastructure previously at the prefab factory.

In particular, the prefab services can perform operations to deploy the software resources to the physical components using device images. For example, a template region network can be built with individual infrastructure and software components deployed as orchestrated by a manager service. Once built, each device of the template region can be imaged to create an image set that corresponds to the network topology and hardware configuration of the template region. The manager service can orchestrate the creation of the image set and the deployment of image sets to target region networks, which may be built in a prefab factory or after installation at a destination site data center. Advantageously, deploying images to devices can occur significantly faster than deploying services to each node in a region network individually when the target hardware is compatible with the image set. Accordingly, a service provider offering region build operations according to the techniques described herein can substantially reduce the expenditure of computational resources even beyond the improvements gained with an automated region build operation.

Certain Definitions

A "region" is a logical abstraction corresponding to a collection of computing, storage, and networking resources associated with a geographical location. A region can include any suitable number of one or more execution targets. A region may be associated with one or more data centers. A "prefab region" describes a region built in a prefab factory environment prior to delivery to the corresponding geographical location. In some embodiments, an execution target could correspond to the destination data center as opposed to the prefab factory data center.

An "execution target" refers to a smallest unit of change for executing a release. A "release" refers to a representation of an intent to orchestrate a specific change to a service (e.g., deploy version 8, "add an internal DNS record," etc.). For most services, an execution target represents an "instance" of a service or an instance of change to be applied to a service. A single service can be bootstrapped to each of one or more execution targets. An execution target may be associated with a set of devices (e.g., a data center).

"Bootstrapping" a single service is intended to refer to the collective tasks associated with provisioning and deployment of any suitable number of resources (e.g., infrastructure components, artifacts, etc.) corresponding to a single service. Bootstrapping a region is intended to refer to the collective of tasks associated with each of the bootstrap of each of the services intended to be in the region.

A "service" refers to functionality provided by a set of resources, typically in the form of an API that customers can invoke to achieve some useful outcome. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component or a Kubernetes engine cluster, this may include software (e.g., an application), configuration information (e.g., a configuration file), credentials, for an infrastructure component, or the like.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" or "software resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPSec Tunnel VPN). Certain essential core services (or "seed" services) like a deployment orchestrator, a public key infrastructure (PKI) service, a dynamic host configuration protocol service (DHCP), a domain name service (DNS), and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. These services can be staged and tested in the ViBE prior to the prefab region (e.g., the target region) being available.

A "Manager Service" may refer to a service configured to manage provisioning and deployment operations for any suitable number of services as part of a prefab region build. A manager service may be used in conjunction with one or more additional prefab services to orchestrate a region build in a prefab factory as well as for managing how the prefabbed region is installed and configured at the destination data center after it is built and shipped over. The manager service and other prefab services may be hosted in an existing region of a CSP.

A "host region" refers to a region that hosts a virtual bootstrap environment (ViBE). A host region may be used to bootstrap a ViBE.

A "target region" refers to a region under build in the prefab factory. During a prefab region build, the target region is associated with physical space, power, and cooling provided by the prefab factory. After bootstrapping, once the prefabbed region has been shipped to the destination data center, the prefabbed region is associated with the destination data center into which it gets installed.

Prefab Region Build

In some examples, techniques for building a region at a prefab factory are described herein. Such techniques, as described briefly above, can include one or more prefab services (e.g., manager service, network service, inventory service, testing service, deployment orchestration system) hosted by a CSP that can manage bootstrapping (e.g., provisioning and deploying software to) infrastructure components for one or more regions within the prefab factory. The prefab factory may be configured to support multiple region builds simultaneously. For example, physical resources (e.g., server racks, network switches, etc.) of a first prefab region may be installed at one location in the prefab factory while physical resources of a second prefab region may be installed at a second location in the prefab factory. Each prefab region can be connected to a dedicated network fabric of the prefab factory to provide networking connections to each prefab region independently, so that each region can communicate with the prefab services and/or other cloud services to support the region build. Based on a build request (a specification of the region, e.g., a number of server racks for the region, a number of computing devices, a number and type services to be hosted by the region, a network topology of the region, etc.), the prefab services can generate instructions to install (e.g., by factory personnel) the corresponding physical infrastructure in the prefab factory, which can include networking the physical devices together on their racks, positioning the racks at locations in the prefab factory, and connecting the devices to the static network fabric of the prefab factory. The manager service can then orchestrate the provisioning of the region infrastructure and deployment of software resources to the prefab region infrastructure, configure the prefab region for transmission, manage (e.g., schedule and monitor) the transmission of the prefab region, and perform testing and verification of the prefab region once it reaches its destination site.

The prefab factory can centralize the region build process to provide more efficient use of computing and networking resources that support region build. For example, the prefab factory may be sited "close" (e.g., with low-latency and high data rate networking connections) to a host region that includes the prefab services and/or a ViBE. Multiple regions may be built using the improved performance of the network connection to the host region, avoiding potential poor performance when performing a region build to a newly constructed data center site for typical region build. The prefab factory also provides improved physical and computational security for the devices during region build, as the CSP can control the prefab factory and the network connections therein.

In addition, the prefab factory improves the management of the inventory of physical components. The manager service can determine which computing devices are needed for a particular region build, which may be stored at or near the prefab factory. As regions are built and shipped, infrastructure for new regions can be quickly moved into the prefab factory and installed, increasing efficiency.

Turning now to the figures, FIG. 1 is a block diagram illustrating a prefab system 100 including a prefab factory 102 for building regions (e.g., Prefab Region 106A, Prefab Region 106B, Prefab Region 106C) and preparing the region computing devices for transmission to target data centers (e.g., data center 108, data center 110), according to at least one embodiment. Each region being built in the prefab factory 102 can include one or more devices that form the computing environment of a data center. The prefab factory 102 can be used to build multiple regions simultaneously. For example, prefab factory 102 can build all of Prefab Region 106A, Prefab Region 106B, and Prefab Region 106C at the same time. In some examples, the devices of a region may be installed and staged in the prefab factory 102 prior to beginning infrastructure provisioning and software deployment operations.

The prefab factory 102 can be a facility similar to a data center, including sufficient power, cooling, and networking infrastructure to support building one or more regions. The prefab factory 102 may be located in proximity to existing computing infrastructure of a CSP (e.g., CSP 104). For example, CSP 104 can operate existing data centers for one or more regions. The prefab factory 102 can be located close to or even adjacent to an existing data center of a host region to provide high data rate network connections between the cloud services of the CSP and the computing devices of the regions being built in the prefab factory 102. Additionally or alternatively, the prefab factory 102 can be located to improve logistical operations including shipping of regions to destination data centers.

A prefab region being built in the prefab factory 102 can include any suitable number of physical resources, including computing devices (e.g., servers, racks of multiple servers, etc.), storage (e.g., block storage devices, object storage devices, etc.), networking devices (e.g., switches, routers, gateways, etc.), and the like. Each region may have different physical resources according to the specific requirements of the destination region and data centers. For example, Prefab Region 106A may include 100 racks each having 40 computing devices, while Prefab Region 106B may include 20 racks each having 30 computing devices. Each rack of computing devices can include one or more networking devices communicatively connected to the server devices on the rack and configured to connect to networking infrastructure of the prefab factory 102 to form a network with other computing devices of the prefab region. Each rack can also include power supplies and cooling devices to support the operation of the computing devices on the racks.

The prefab factory 102 can include any suitable number of networking devices to support the installation and connection of the one or more computing devices of the prefab regions being built. For example, the prefab factory 102 can include any suitable number of leaf and spine switches to support the connection of computing devices on multiple racks to form the network of a prefab region. Similarly, the prefab factory 102 can include network cabling installed in the facility that can provide network connections to the networking infrastructure of the prefab factory 102. The network cabling may be positioned to terminate at locations within the prefab factory 102 where racks of computing devices for the prefab regions may be installed during region build operations. Additional details about the networking infrastructure and configuration of the prefab factory are provided below with respect to FIGS. 9-11.

The prefab factory 102 may be connected over one or more networks to services provided by CSP 104. During region build operations, CSP 104 can provision infrastructure components on the physical resources of the prefab regions and deploy software resources, configurations, and/or other artifacts to the provisioned infrastructure components. For example, CSP 104 can provision the computing devices of Prefab Region 106A to host one or more virtual machines, provide hostnames, network addresses, and other network configurations for the provisioned physical and virtual devices, and then deploy one or more services to be executed on the provisioned infrastructure. The prefab region may be brought to a state that is close to the final production state of the devices when they are installed at the destination facility.

Once the prefab region has been built, the physical resources may be configured for transmission/transportation to the destination facility. As used herein, the term "transmission" may be used synonymously with the term "transportation" within the context of moving the physical resources associated with the prefab region from the prefab factory to a destination site. Configuring the prefab region for transmission can include obtaining a "snapshot" of the current network configuration of the computing devices in the prefab region, storing the snapshot, providing a portion of the snapshot to each computing device that includes identifiers for each device and its neighboring devices within the network, encrypting data volumes of the computing devices, and configuring the devices to boot into a test state when powered on after transmission. In addition to network snapshots, the prefab services of the CSP 104 may also capture device snapshots which are disk images taken of fully configured individual switches, compute devices, and smart NICs in the various racks to be shipped to the destination site. The device snapshots can enable rapid replacement of any device in the racks that get shipped if that device is non-functional after arrival and has to be replaced. Transportation to a destination facility may be by one or more methods, including shipment by truck 112 or shipment by aircraft 114. For example, Prefab Region 106B may be configured to be delivered by truck 112 to data center 108, while Prefab Region 106C may be configured to be delivered by aircraft 114 to data center 110.

Once the computing devices of a prefab region arrive at the destination facility, they may be installed at the facility according to the configuration of the facility. The destination facilities can be data centers that have been built to host the prefab region devices, with networking, power, cooling, and other infrastructure provided according to the configuration of the prefab region. The data centers can have network connections to the CSP 104. Installation of the prefab region can include manual operations for connecting racks and their computing devices to the network infrastructure of the data centers and other related tasks. Once the physical connections have been made, the devices of the prefab region can be powered on, which can initiate one or more testing operations by the devices based on the configuration that was performed at the prefab factory 102 prior to transmission. The prefab regions can also connect to the CSP 104 via one or more network connections to the data center to communicate with prefab services. For example, Prefab Region 106B can connect to CSP 104 via connection 118, while Prefab Region 106C can connect to CSP 104 via connection 116. The prefab services can deploy final configurations for the installed devices, deploy updates to software resources on the installed devices, and perform additional testing and verification operations for the prefab region at the destination data center.

Figure 2:
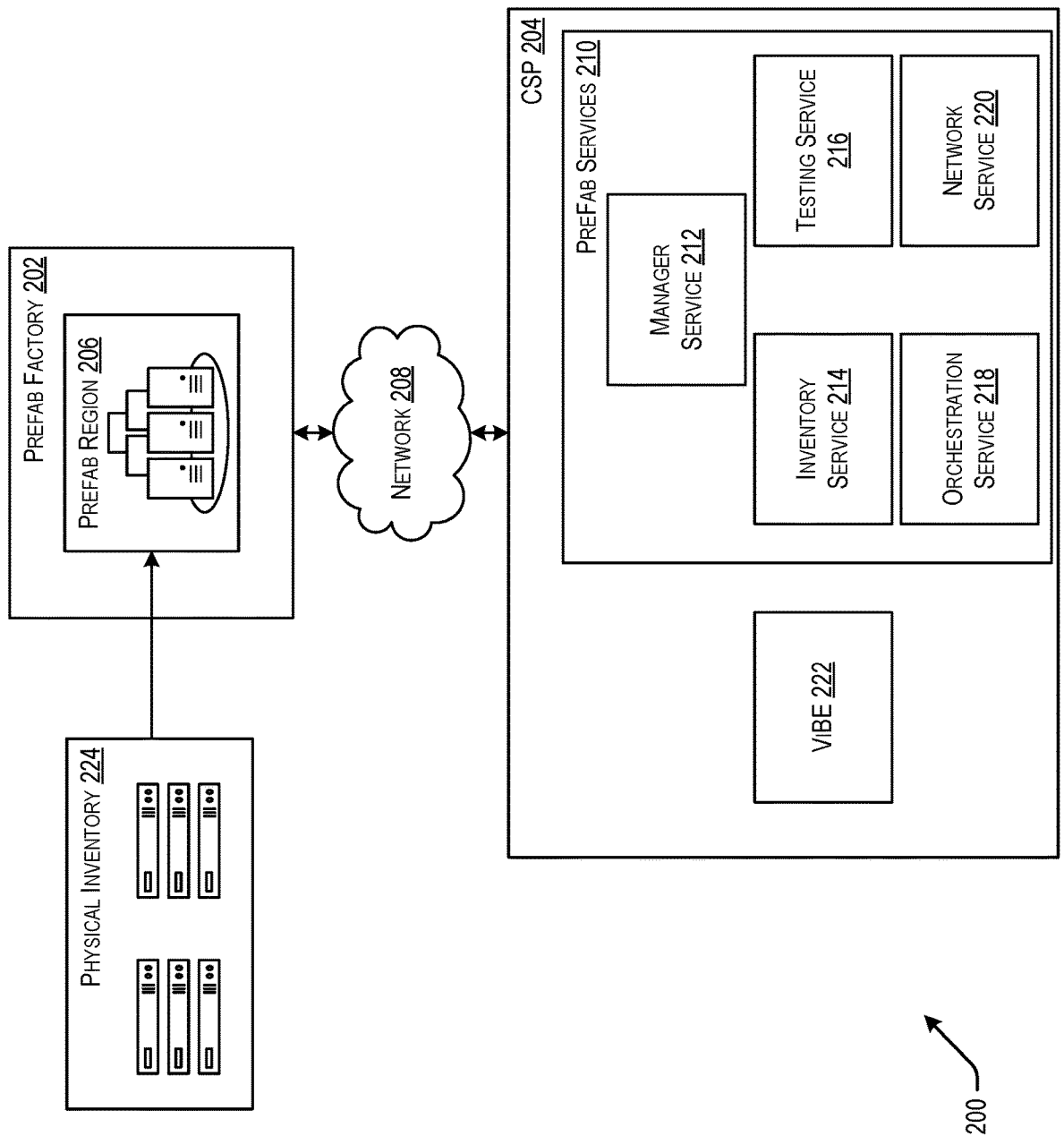
FIG. 2 is a block diagram illustrating a prefab factory connected to services provided by a CSP for building regions, according to at least one embodiment.

FIG. 2 is a block diagram illustrating a prefab system 200 including a prefab factory 202 connected to prefab services 210 provided by a CSP 204 for building regions, according to at least one embodiment. The prefab factory 202 may be an example of prefab factory 102 of FIG. 1, and CSP 204 may be an example of CSP 104 of FIG. 1. The prefab factory 202 may interface with the CSP 204 via network 208, which may be a public network like the Internet, a private network, or other network. The prefab services 210 can include manager service 212, inventory service 214, testing service 216, orchestration service 218, and network service 220. The prefab services 210 can perform operations corresponding to building the prefab region 206 in the prefab factory 202, including managing a bootstrapping environment (e.g., ViBE 222), provisioning infrastructure components in the Prefab Region 206, deploying software resources to the Prefab Region 206, configuring the network of the Prefab Region 206, testing the Prefab Region at various points during the build process, and managing the physical inventory (e.g., physical inventory 224) of computing devices used to build Prefab Region 206 and other prefab regions being built at prefab factory 202.

The manager service 212 can perform tasks to coordinate the operations of the prefab services 210, including scheduling prefab region build operations by other prefab services 210, generating physical build requests and corresponding instructions, initiating shipping of the prefab region 206 to a destination site, and managing the provisioning and deployment of resources in the prefab region 206 both in the prefab factory 202 and at the destination site. A physical build request can specify the number and type of physical resources to be used in Prefab Region 206. The physical build request can also include a set of instructions usable by personnel to install the corresponding physical resources in the prefab factory 202. For example, the manager service 212 may generate a physical build request that specifies the number of racks and server devices for Prefab Region 206, the number of networking devices usable to connect the server devices to form the network of Prefab Region 206, and the connection plan that determines the networking connections between the specified server devices, networking devices, and the existing networking infrastructure of the prefab factory 20. The physical build request can also include instructions for personnel to obtain physical devices from an associated location (e.g., physical inventory 224) and instructions to install the devices in the prefab factory 202 at specified locations. In some embodiments, operations of the physical build request may be performed by automated systems under the control of the manager service 212. For example, obtaining racks of server devices from physical inventory 224 and installing the racks at prefab factory 202 may be performed by a robotic system configured to move physical racks from site to site.

The inventory service 214 may be configured to track and monitor physical devices corresponding to one or more regions (e.g., one or more data centers of a region). The inventory service 214 can also track physical devices for one or more prefab regions (e.g., Prefab Region 206) in the prefab factory 202. Tracking and monitoring the physical devices can include maintaining an inventory of the devices according to an identifier of the device (e.g., serial number, device name, etc.) and the association of the devices with a data center. The inventory service 214 can provide inventory information to other prefab services 210, including manager service 212, for use in the prefab region build process. For example, inventory service 214 can determine if a physical device is located at prefab factory 202 or at a destination site. Inventory service 214 can query devices to determine their location and/or association with a region, prefab region, or data center via a network (e.g., network 208). Inventory service 214 can also maintain a physical inventory (e.g., physical inventory 224) of devices that are stored for use in prefab region build operations. For example, inventory service 214 can track physical devices as they are received at the physical inventory 224 and then retrieved from the physical inventory 224 to be used as part of a prefab region at prefab factory 202. In some examples, inventory service 214 can provide inventory information to manager service 212 that is usable to generate a physical build request for Prefab Region 206 that includes instructions to obtain physical resources from physical inventory 224 and install the physical resources at the prefab factory 202.

The physical inventory 224 may be a warehouse or storage facility for storing physical resources (e.g., computing devices) for use in prefab region build operations. The physical inventory 224 may be located near the prefab factory 202 to facilitate retrieval of physical resources according to a physical build request. For example, the physical inventory 224 may be a building adjacent to a building used for the prefab factory 202. In some examples, the physical inventory 224 may be located within the prefab factory 202. Physical resources may be placed into and retrieved from the physical inventory 224 by personnel associated with the CSP and the prefab factory 202. In some instances, during prefab region build operations, the retrieval and installation of physical resources from physical inventory 224 may be done by robots, automated guided vehicles, or other similar autonomous or semi-autonomous systems using instructions provided by the physical build request.

The orchestration service 218 may be configured to perform bootstrapping operations to provision infrastructure components in the Prefab Region 206 and to deploy software resources to the Prefab Region 206. The orchestration service 218 can also construct a bootstrapping environment (e.g., ViBE 222) for use when bootstrapping resources into the Prefab Region 206. The orchestration service 218 may be an example of a deployment orchestrator described above. In some examples, the orchestration service 218 may be configured to bootstrap (e.g., provision and deploy) services into a prefab region (e.g., Prefab Region 206) based on predefined configuration files that identify the resources (e.g., infrastructure components and software to be deployed) for implementing a given change to the prefab region. The orchestration service 218 can parse and analyze configuration files to identify dependencies between resources. The orchestration service 218 may generate specific data structures from the analysis and may use these data structures to drive operations and to manage an order by which services are bootstrapped to a region. The orchestration service 218 may utilize these data structures to identify when it can bootstrap a service, when bootstrapping is blocked, and/or when bootstrapping operations associated with a previously blocked service can resume.

In some embodiments, the orchestration service 218 may include components configured to execute bootstrapping tasks that are associated with a single service of a prefab region. The orchestration service 218 can maintain current state data indicating any suitable aspect of the current state of the resources associated with a service. In some embodiments, desired state data may include a configuration that declares (e.g., via declarative statements) a desired state of resources associated with a service. In some embodiments, orchestration service 218 can identify, through a comparison of the desired state data and the current state data, that changes are needed to one or more resources. For example, orchestration service 218 can determine that one or more infrastructure components need to be provisioned, one or more artifacts deployed, or any suitable change needed to the resources of the service to bring the state of those resources in line with the desired state. Specific details about a particular implementation of orchestration service 218 is provided in U.S. patent application Ser. No. 17/016,754, entitled "Techniques for Deploying Infrastructure Resources with a Declarative Provisioning Tool," the entire contents of which are incorporated in its entirety for all purposes.

The ViBE 222 may be an example of a bootstrapping environment that can be used to deploy resources to a prefab region in a prefab factory 202. A ViBE can include a virtual cloud network (e.g., a network of cloud resources) implemented within a suitable region of a CSP (e.g., CSP 204). The ViBE can have one or more nodes (e.g., compute nodes, storage nodes, load balancers, etc.) to support operations to host services deployed by orchestration service 218. The ViBE services can in turn be used to support deployment of services into the Prefab Region 206. For example, orchestration service 218 may deploy an instance of one or more constituent services of the orchestration service 218 into the bootstrapping environment (e.g., an instance of orchestration service 218), which in turn may be used to deploy resources from the ViBE 222 to the Prefab Region 206. Because a ViBE is implemented as a virtual cloud network in an existing region, any suitable amount of region infrastructure may be provisioned to support the deployed services within the ViBE (as compared to the fixed hardware resources of a seed server). The orchestration service 218 may be configured to provision infrastructure resources (e.g., virtual machines, compute instances, storage, etc.) for the ViBE 222 in addition to deploying software resources to the ViBE 222. The ViBE 222 can support bootstrapping operations for more than one prefab region in the prefab factory 202 at the same time.

When the Prefab Region 206 is available to support bootstrapping operations, the ViBE 222 can be connected to the Prefab Region 206 so that services in the ViBE 222 can interact with the services and/or infrastructure components of the Prefab Region 206. This can enable deployment of production level services, instead of self-contained seed services as in previous systems, and may require connectivity over the internet to the target region. Conventionally, a seed service was deployed as part of a container collection and used to bootstrap dependencies necessary to build out the region. Using infrastructure/tooling of an existing region, resources may be bootstrapped into the ViBE 222 and connected to the Prefab Region 206 in order to provision hardware and deploy services until the Prefab Region 206 reaches a self-sufficient state (e.g., self-sufficient with respect to services hosted within the Prefab Region 206). Utilizing the ViBE 222 allows for standing up the dependencies and services needed to be able to provision/prepare infrastructure and deploy software while making use of the host region's resources in order to break circular dependencies of core services.

The testing service 216 may be configured to perform one or more test operations or validation operations on the Prefab Region 206 following the provisioning and/or deployment of resources. The test operations may be part of a user-acceptance test usable to determine if the behavior of the built region conforms to a build specification. For example, testing service 216 may perform a test that interacts with an instance of a service deployed to the Prefab Region 206 to verify an expected operation of the queried service. As another example, testing service 216 may perform a networking test to obtain hostnames, networking addresses, and/or other identifiers of the components of the Prefab Region 206 to compare to the expected identifiers of the components as specified in a build request or other specification for the Prefab Region 206. Testing service 216 may perform test operations both during the prefab region build process at prefab factory 202 and after delivery of the Prefab Region 206 to a destination site. The testing operations performed at the prefab factory 202 may be the same or different from testing operations performed after the Prefab Region 206 is delivered to the destination site.

The manager service 212 can obtain inventory information from inventory service 214 for use when generating a physical build request. For example, the inventory information may be used by manager service 212 to determine which physical resources to install in the prefab factory 202 for a prefab region corresponding to the physical build request.

Figure 3:
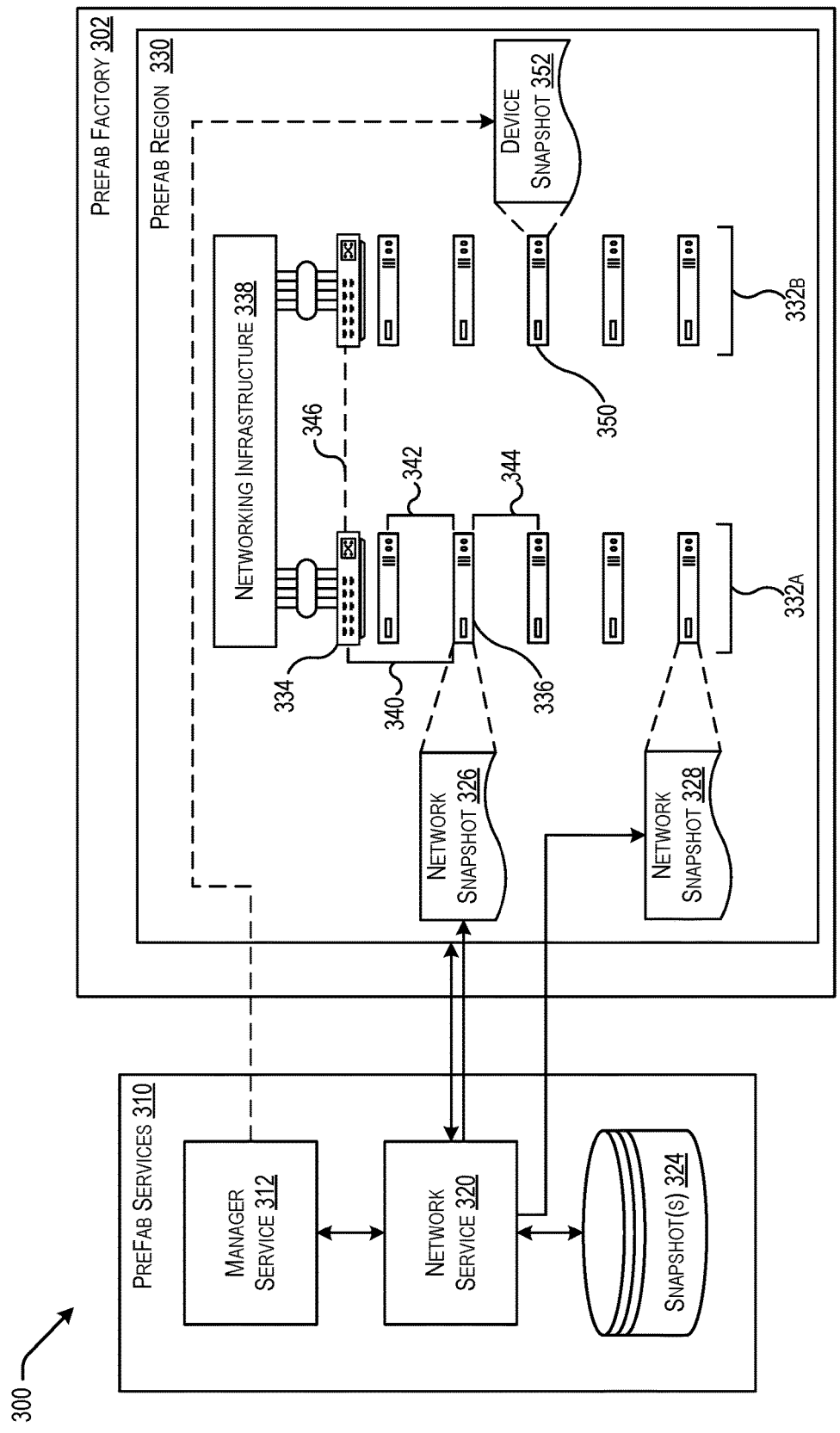
FIG. 3 is a diagram illustrating managing a network configuration of computing resources of a region being built in a prefab factory using a manager service and a network service, according to at least one embodiment.

FIG. 3 is a diagram illustrating a CSP system 300 for managing a network configuration of computing resources of a Prefab Region 330 being built in a prefab factory 302 using a manager service 312 and a network service 320, according to at least one embodiment. The prefab factory 302 and Prefab Region 330 may be examples of other prefab factories and prefab regions described herein, including prefab factory 202 and Prefab Region 206 of FIG. 2. Prefab services 310 may be provided by the CSP and may be examples of prefab services 210 described above with respect to FIG. 2, including manager service 312 as an example of manager service 212 of FIG. 2 and network service 320 as an example of network service 220 of FIG. 2.

As described above with respect to FIG. 2, the manager service 312 can perform tasks to coordinate the operations of the prefab services 310, including scheduling prefab region build operations by other prefab services 310, generating physical build requests and corresponding instructions, and configuring Prefab Region 206 for shipping to a destination site. A physical build request can specify the number and type of physical resources to be used in Prefab Region 206. The network service 320 can use configuration information from a build request to determine a network topology of the devices (e.g., servers, networking devices, racks of servers and networking devices, etc.). The network service 320 can also determine the network configuration of devices of the Prefab Region 330 after the provisioning of infrastructure components in the Prefab Region 330.

In some examples, the network service 320 can store a snapshot of the network configuration of a prefab region (e.g., Prefab Region 330). A snapshot can include information about the network topology of the prefab region at a specific point in time, including network identifiers (e.g., network addresses, hostnames, etc.) for the devices in the prefab region, the current network connections between the devices, the physical networking interfaces between the devices and the networking infrastructure 338 of the prefab factory 302, and network settings for the devices (e.g., port configurations, gateway configurations, etc.). As an example, server device 336 may be a computing device in server rack 332A of Prefab Region 330. Server device 336 may have a networking connection 340 to switch 334 of server rack 332. The network configuration of Prefab Region 330 can then include information associating server device 336 to switch 334, including information specifying the type of network connection 340, the port of switch 334 to which server device 336 is connected, and the settings of both server device 336 and switch 334 that correspond to the networking connection 340 between them. In addition, the network configuration can include information that associates server device 336 with "neighboring" devices in Prefab Region 330 that have networking connections 342, 344 between them. The networking connections 342 and 344 may be via switch 334, so that server device 336 may be communicatively connected to other devices in server rack 332A via network connections 342, 344. In some examples, "neighboring" devices of a given device in Prefab Region 330 can include each computing device on the same server rack. In addition, switch 334 may have network connections to one or more other switches within Prefab Region 330 (e.g., network connection 346 to a switch of server rack 332B).

The network snapshot may be used to validate the physical installation (e.g., physical networking connections) of Prefab Region 330 after the devices are installed at the destination site. For example, network service 320 can provide the network snapshot (or a portion of the snapshot) to each device in the Prefab Region 330 as part of configuring the Prefab Region 330 for transportation to a destination site. For example, network service 320 may provide network snapshot 326 to server device 336 for storage at server device 336. Network snapshot 326 may be a portion of the network snapshot corresponding to the network configuration of the entire Prefab Region 330. Network snapshot 326 can include an identifier (e.g., network address, hostname, etc.) for server device 336 and information associating server device 336 with one or more other devices in Prefab Region 330. The information associating server device 336 with a neighboring device can include an identifier for the neighboring device and information about the network connection between them. For example, server device 336 can use network snapshot 326 to identify neighboring devices and communicate with the neighboring devices over the network connection.

The network service 320 may also maintain a network configuration for the network fabric of the prefab factory 302. For example, the prefab factory 302 can have networking infrastructure to support multiple, separate prefab regions being built at the same time. The prefab factory 302 can have multiple dedicated locations for placing server racks for the prefab regions being built. Each location may have a set of networking cables of the networking infrastructure that terminate at the location that can be connected to the server racks. Based on the devices placed at the location, specific cables from the set of networking cables can be connected to the devices (e.g., to a top-of-rack switch) to connect the devices to other devices in the prefab region using a portion of the network fabric of the prefab factory 302. For example, server rack 332A may be placed at a location within the prefab factory 302 and connected to networking infrastructure 338 using switch 334, while server rack 332B may be placed at a second location and connected to networking infrastructure 338.

In addition to operations for preserving the network configuration of the Prefab Region 330, configuring Prefab Region 330 for transportation to a destination site can also include the manager service 312 configuring each device to enter a testing state during a subsequent power-on of the device, encrypting data volumes of the devices with encryption keys, storing the encryption keys at a device that can act as a key server for the Prefab Region 330 during initialization at the destination site, and configuring one of the devices to act as dynamic host configuration protocol (DHCP) server during initialization of the Prefab Region 330 at the destination site. Manager service 312 may also generate instructions usable by personnel or robotic systems associated with the prefab factory 302 for packing the devices for transmission. Manager service 312 may also generate instructions usable by personnel associated with the destination facility for installing and connecting the devices at the destination facility.

In some embodiments, configuring the devices of Prefab Region 330 can also include operations to capture device snapshots of each device. A device snapshot can include a software image of one or more disk drives or other memory of a computing device, which can be used to duplicate the software configuration of the device onto a replacement device. The manager service 312 can generate the device snapshots in conjunction with one or more of the prefab service 310. The device snapshots may be stored along with the network snapshot(s) in a database or datastore (e.g., snapshot(s) 324). As a particular example, manager service 312 can generate device snapshot 352 of server device 350 of Prefab Region 330 at the prefab factory 302. The device snapshot 352 may be used to image another physical device that has the same or similar physical configuration as server device 350 in order to create a duplicate server device in the event that server device 350 fails (e.g., damaged or lost during transit to the destination site).

Figure 4:
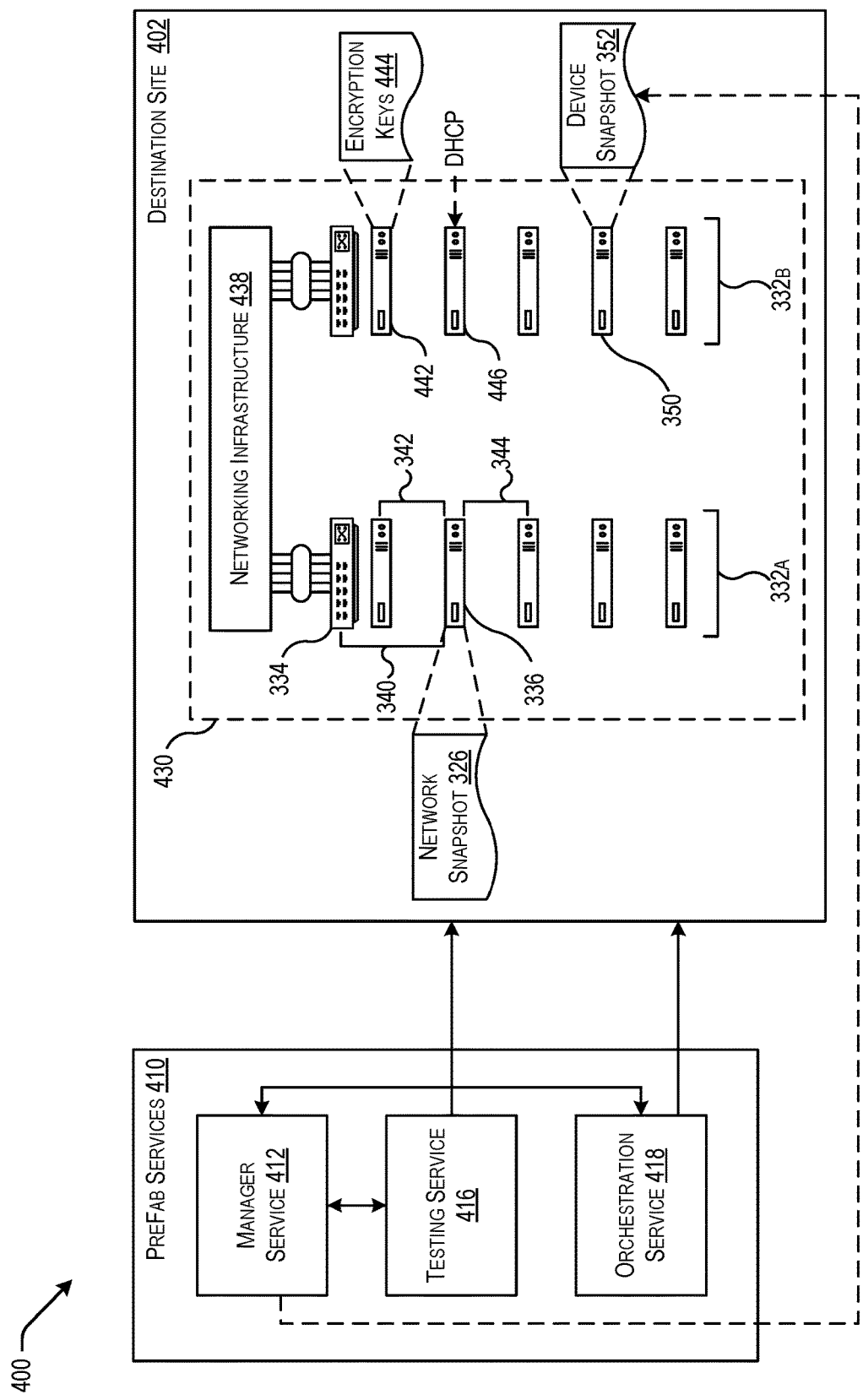
FIG. 4 is a diagram illustrating a testing and evaluation of a region after delivery to a destination site using a manager service and a testing service, according to at least one embodiment.

FIG. 4 is a diagram illustrating a CSP system 400 for testing and evaluation of a Prefab Region 330 after delivery to a destination site 402 using a manager service 412 and a testing service 416, according to at least one embodiment. The destination site 402 may be a data center facility at a location corresponding to new region to be deployed for the CSP using the computing resources of Prefab Region 430. Prefab services 410 may be provided by the CSP and may be similar to prefab services 210 of FIG. 2, including manager service 412 as an example of manager service 212, testing service 416 as an example of testing service 216, and orchestration service 418 as an example of orchestration service 218 of FIG. 2.

Shipping Prefab Region 330 to the destination site 402 can include powering down each device, disconnecting the devices from the networking infrastructure of the prefab factory, and packing the devices as appropriate for transit. Server racks (e.g., server racks 332A, 332B may be shipped intact, without disconnecting individual devices of the server rack. Once delivered to the destination site 402, the server racks may be positioned in the destination site 402 per the physical layout of the resulting data center and connected to the networking infrastructure 438 of the destination site. For example, networking connections may be made between the networking infrastructure 438 and the switches of the server racks 332A, 332B by connecting one or more networking cables to the switches (e.g., switch 334).

As described above, the devices in Prefab Region 330 may have been configured to boot into a test mode when first powered on at the destination site 402. In some embodiments, the devices may have a dedicated boot volume to support the test mode during initialization at the destination site 402. In other embodiments, the boot volume may be configured on an external device connected to each device in the Prefab Region 330. For example, each server device (e.g., server device 336) may be connected to a smart network interface card (SmartNIC) that provides a low-overhead boot volume that can be used to boot the server device into a test mode. Because the boot volume may only be used to support the test mode, the data on the boot volume may not need to be encrypted as with data volumes on the server devices.

The test mode may be configured to cause each computing device to validate its connection to other devices in the Prefab Region 330. The validation can determine if the physical network connections of the devices to the networking infrastructure 438 at the destination site 402 were made correctly. To validate a connection, a device in the test mode may use a stored network configuration or portion of the network configuration that was determined by a network service (e.g., network service 320 of FIG. 3) and stored at each device. For example, server device 336 can use network snapshot 326 to determine a neighboring computing device that is communicatively connected to server device 336 by network connection 342. To validate the network connection 342, server device 336 may send a validation request to the neighboring computing device. If the network connection 342 is intact, then server device may receive a validation indication from the neighboring computing device that indicates that the validation request was successfully received at the neighboring computing device. The server device 336 may validate all of the connections specified in network snapshot 326. Similarly, devices on one server rack (e.g., server rack 332A) may validate a connection to each other server rack (e.g., server rack 332B) in the Prefab Region 330.

In some embodiment, one device of Prefab Region 330 may be configured to act as a DHCP server (e.g., DHCP server 446). The DHCP server 446 may provide network addresses or other identifiers to the devices in Prefab Region 330 during initialization. For example, during test mode, each device may validate a connection to the DHCP server 446 and then receive an address, identifier, or other network configuration information from the DHCP server 446. The device may compare the received identifier to an identifier included in the network configuration that was generated by the network service during prefab region build operations at the prefab factory. For example, server device 336 can receive an identifier from DHCP server 446 and then compare the received identifier to an identifier in network snapshot 326. Because the Prefab Region 330 should not have undergone any component changes during transit, the network configuration of the Prefab Region 330 at the destination site 402 should be unchanged, including configuration information from DHCP server 446. That is to say, server devices in the Prefab Region should receive the same network addresses from DHCP server 446 after installation of the devices at the destination site 402. If the network configuration changes, then the server devices can indicate that the network configuration of Prefab Region 330 may be incorrect.

In some embodiments, if any device was damaged in transit and no longer works, operators at the destination site may replace the broken device with a new replacement device and configure the new device with the device snapshot taken prior to shipping thus allowing the on-site post-install validation to complete successfully even if there was hardware failure in transit. For example, server device 350 may be damaged during transportation to the destination site 402. Discovery of the non-functional state of server device 350 may occur during testing operations to validate the network configuration of the Prefab Region 330. To recover, the manager service 412 can generate instructions to replace server device 350 with an identical physical device at the same location on server rack 332B. Once the replacement device is installed, the manager service 412 can deploy the device snapshot 352 that was generated during prefab region build operations in the prefab factory 302. Deploying the device snapshot 352 can include imaging one or more disk drives or other memories of the replacement server device to bring the replacement server device to the same software configuration as server device 350 in the Prefab Region 330 prior to transportation to the destination site 402. Other devices, including networking devices like switch 334, may be similarly replaced and restored using the captured device snapshots.

The DHCP server 446 can perform test mode validation operations similar to other devices within Prefab Region 330. If DHCP server 446 can successfully validate the network connections between neighboring devices and itself, DHCP server 446 can exit test mode and begin operating as a DHCP server to other devices in the Prefab Region 330. In some embodiments, DHCP server 446 may complete its test mode validation operations prior to other devices in Prefab Region 330 completing their test mode validation operations. For example, server device 336 may boot into test mode and attempt to validate a network connection to DHCP server 446 before validating network connection 342 or network connection 344 between itself and neighboring computing devices. DHCP server 446 may not send a validation indication to server device 336 until DHCP server 446 has completed its own test mode validation operations. Server device 336 can then wait a predetermined amount of time and retry the validation request to DHCP server 446. Similarly, other computing devices performing test mode validation operations may wait and retry validation requests until DHCP server 446 is operational.

As described above, data volumes of the devices in Prefab Region 330 may be encrypted prior to transportation to the destination site 402. The encryption keys used to encrypt the data volumes of each device may be associated with that specific device. The encryption keys 444 may be stored at one of the computing devices in Prefab Region 330 configured to act as a key server for the Prefab Region 330 during initialization (e.g., stored at key server 442). The encryption keys 444 may themselves be encrypted by a master key. In some embodiments, encryption keys 444 may be secured by a hardware security module (e.g., a trusted platform module (TPM)). The hardware security module may be part of key server 442 or may be part of another device connected to key server 442 (e.g., a SmartNIC, an external security device, etc.). In some embodiments, the master key or external security device may be delivered to the destination site 402 separately from the Prefab Region 330 (e.g., by operations personnel) and provided to or installed at the key server 442 as part of the installation operations for Prefab Region 330. Key server 442 may perform test mode validation operations similar to other computing devices in Prefab Region 330. If test mode validation operations complete successfully, key server 442 may begin providing encryption keys 444 to other computing devices in the Prefab Region to decrypt the data volumes. For example, key server 442 may receive a key request from server device 336. In response, key server 442 can decrypt the data volume storing encryption keys 444 (e.g., via a master key, via a hardware security module), retrieve an encryption key corresponding to server device 336, and send the encryption key to server device 336.

Once the Prefab Region 330 has been installed and initialized at destination site 402 (e.g., devices boot into a normal operating mode, data volumes decrypted, services deployed during prefab region build operations at the prefab factory are executing), testing service 416 can perform one or more acceptance tests. An acceptance test can include verifying that all services are functioning as expected. For example, testing service 416 can interact with a service executing at Prefab Region 330 to verify that the service is operating according to the requirements that define the acceptance test. Testing service 416 can provide results of an acceptance test to manager service 412 indicating that Prefab Region build is complete.

During transportation of Prefab Region 330 to destination site 402, updates or other changes may be specified for one or more infrastructure components and/or software resources that had been provisioned at and/or deployed to Prefab Region 330 at the prefab factory. For example, a service may have been updated to a newer version during the transit time. Before the prefab region build operation is complete, orchestration service 418 can deploy updated software resources to Prefab Region 330 at destination site 402. Deploying an updated software resource may occur similar to deployment of software resources to the Prefab Region 330 at the prefab factory.

Image-Based Region Build

The provisioning of infrastructure components and deployment of software resources within a region network using a prefab factory allow for great flexibility and customization of each individual region network that is built. In particular, orchestrating the deployment of services, virtual machines, databases, object storage, compute instances, load balancers, and the like using a manager service ensures the correct dependencies and networking integrity of the deployed resources as the region is built. In some instances, it may be desirable to deploy software resources in an image-based manner. Regions built at a prefab factory can have similar or identical physical resources (e.g., server devices, network devices, etc.) from one region to the next, so that deploying a single software image to a physical device can save significant time and computational resources over deploying and configuring software resources to each physical resource separately. For example, regions can include a predefined arrangement of server racks, each with a predefined number of server devices conforming to the same configuration of processing, memory, storage, and the like. Thus, capturing a software image for each physical device and then deploying those images to similar devices can be more efficient than deploying software resources to each device individually when building a new region in a prefab factory.

As used herein, the term "image" refers to a collection of software and firmware resources corresponding to a physical computing device (e.g., server device, networking device, etc.). For example, an image of a server device can include the operating system, deployed applications, and configuration data stored in the persistent memory of the server device. The image can therefore also include data for the state of virtual machines hosted by the server device and persisted in the memory of the server device when the image is captured. An image can also include the networking configuration of the server device as well as identifiers for the server device and software resources thereon (e.g., hostname, network addresses, domain name system (DNS) names, certificates, etc.).

Software resources deployed to region during prefab region build operations in a prefab factory can include several services (e.g., storage, compute, networking, etc.), each of which may be composed of smaller microservices depending on the architecture of the services. The interdependency of various services and microservices on the other services hosted within the region can complicate a naïve image-based deployment. For example, a software resource for a service may be hosted on one device within a region, but depend on another software resource for another service hosted on a second device within the region. The appropriate networking configuration between the one device and the second device can allow the services to communicate and operate correctly. However, deploying an image of each device to two other devices in a new region may not recreate the correct networking relationship between the two devices without properly accounting for the network topology of both the region from which the images were created or the network topology of the new region that is being built in an image-based manner. The techniques described in the present disclosure can build image sets that can be deployed to the physical resources of regions being built while preserving the dependencies between the services and software resources on each device.

A manager service can be configured to create an image set from a region. For example, a template region may be built in the prefab factory according to techniques described above. Once the infrastructure components and software resources are provisioned and deployed to the template region, the manager service can obtain images from each device in the template region as well as a network topology for the network region. The network topology for the template region can specify the arrangement of server devices in a server rack, identify networking devices for each server rack, and specify the networking connections between each server rack. For example, the network topology can identify the fourth server device on server rack two, its connection to the top of rack switch for server rack two, and the connection of the top of rack switch to other networking infrastructure within the template region. With the network topology, the images for each device can be deployed to a region being built according to the topology.

The template region may include the same number of physical resources (e.g., server devices, server racks, networking devices, etc.) as a target region to be built using the image-based region build operations described herein. In some embodiments, the template region may be sized to accommodate one or more "standard" region sizes. For example, regions built in the prefab factory may typically include 20 server racks each with ten server devices, so that the template region can also have 20 server racks each with ten devices. Then, images created from the template region can be readily deployed to common configurations of devices for regions in the prefab factory. In most instances, the template region may be topologically identical (e.g., have the same network topology) to the target regions built using image-based region build operations. In some embodiments, the template region may not be topologically identical to the target region. For example, the target region may be larger than the template region by having additional server racks. The image set from the template region may be deployed to the target region onto the devices that correspond to the network topology of the template, while the additional server racks are provisioned separately (e.g., using a generic machine image, using orchestrated region build operations) and integrated into the region network as part of a final configuration.

When building the template region, deployed resources may be configured with identifiers corresponding to the template region. For example, the template region may include hostnames, network addresses, certificates, region name, and other identifiers to implement network connectivity within the template region network. However, these identifiers may not be suitable for use in a target region. The images obtained for the template region may need to be made agnostic to the template region network configuration before being deployed to the target region physical resources. The manager service can be configured to anonymize the images in an image set by replacing region specific identifiers (e.g., a numeric identifier, a universally unique identifier ("UUID"), human-readable label, region specific network address, region specific hostnames, etc.) with a generic identifier (e.g., generic hostname). In some embodiments, the template region may be built using generic or anonymized identifiers, so that the images need not be anonymized separately when building the image set. When the target region is built using image-based region build operations, the manager service can orchestrate the late binding of identifiers corresponding to the target region. Specific details of rotating region network addresses, resource identifiers, and service endpoints may be found in U.S. patent application Ser. No. 18/215,632, entitled "TECHNIQUES FOR ROTATING NETWORK ADDRESSES IN PREFAB REGIONS;" Ser. No. 18/382,885, entitled "TECHNIQUES FOR ROTATING SERVICE ENDPOINTS IN PREFAB REGIONS;" and Ser. No. 18/520,510, entitled "TECHNIQUES FOR ROTATING RESOURCE IDENTIFIERS IN PREFAB REGIONS;" the contents of which are herein incorporated by reference in their entirety for all purposes.

Image-based region build operations can provide numerous advantages over conventional resource deployment operations. As one example, copying a device image from a repository to a target device can occur significantly faster than deploying all of the individual software resources to the same device. If some or all of the devices for a target region are built from corresponding images, the speed and computational efficiency of the entire region build process can be greatly improved. As another example, customization of deployed software resources in the images can be shifted from the prefab factory to the destination site. Because some configuration operations at the prefab factory may be duplicative of configuration operations at the destination site, performing an image-based region build with anonymized images and then late-binding the region-specific identifiers can avoid duplicative configuration tasks between the prefab factory and the destination site.

Figure 5:
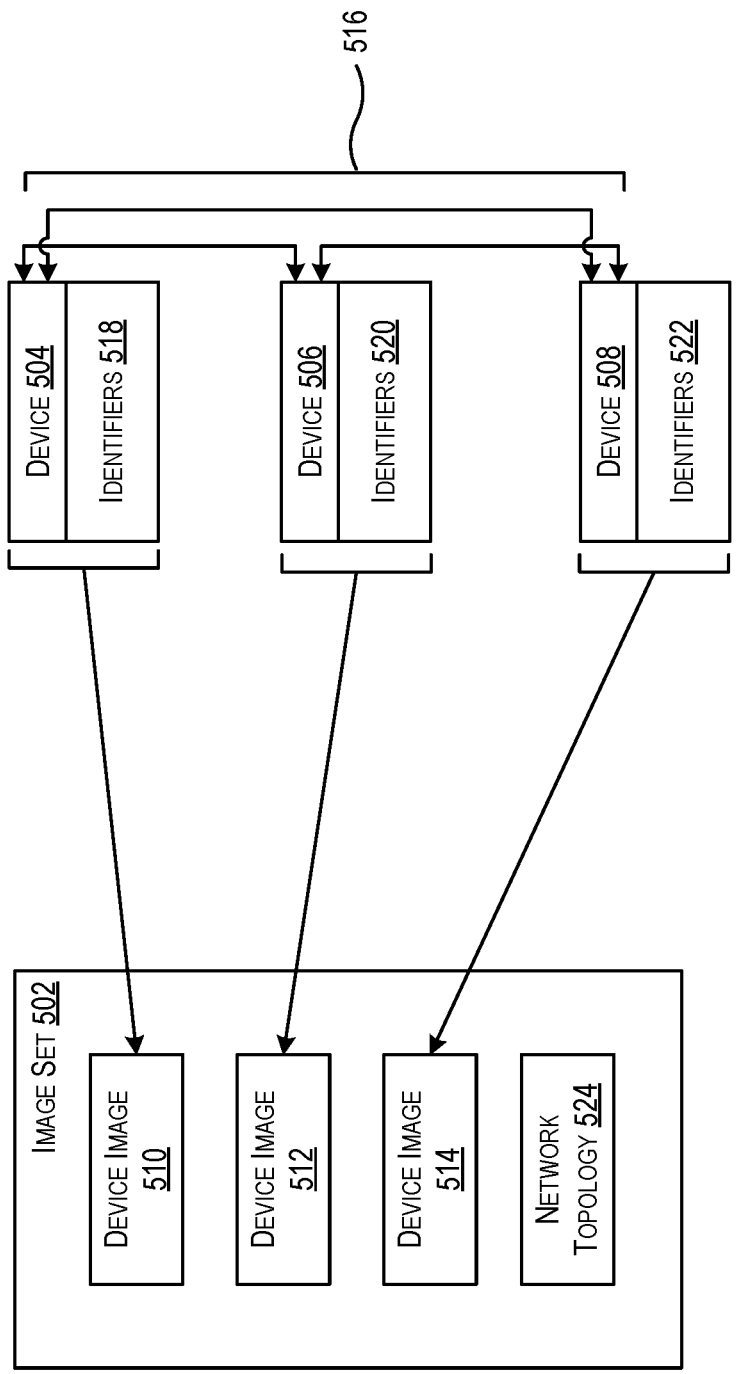
FIG. 5 is a block diagram illustrating the creation of an image set for region devices, according to at least one embodiment.

FIG. 5 is a block diagram illustrating the creation of an image set 502 for region devices (e.g., device 504, device 506, device 508) in a template region 500, according to at least one embodiment. The template region 500 can be an example of a prefab region (e.g., prefab region 330 of FIG. 3) built at a prefab factory (e.g., prefab factory 302 of FIG. 3). In some embodiments, the template region 500 can be a collection of computing devices and networking devices configured as a region network for the purposes of building image sets according to the techniques described herein.

As shown in FIG. 5, the devices 504-508 can be computing devices (e.g., server devices, racks of server devices, etc.), networking devices (e.g., network switches, gateways, etc.), or other suitable physical resources for the template region 500. The devices 504-508 may be connected together to form a region network. For example, device 504 may be connected to device 506 and device 508 in a network arrangement 516. The network arrangement 516 can include additional connections to other devices, including networking devices and other networking infrastructure.

Devices 504-508 can be associated with one or more identifiers 518-522. As described briefly above, physical resources within a region network can host software resources that include identifiers. For example, identifiers can be a numeric identifier, a universally unique identifier ("UUID"), human-readable label or resource name (e.g., a "type" of resource like a VM for virtual machine). In some examples, the identifiers 518-522 can include device-specific or software resource specific information like network addresses, hostnames, and the like.

To build the image set 502, a manager service (e.g., manager service 412 of FIG. 4) can be configured to generate a device image from each device in the template region 500. The device image may be a copy one or more of the memories of each device. For example, the device image 510 may be a copy of the data stored at device 504. Similarly, device image 512 may be a copy of the data stored at device 506, while device image 514 may be a copy of the data stored at device 508. The device image can include the operating system, deployed software resources, services, and/or applications persisted at each device, and other data stored at the device so that when the image is deployed to (e.g., copied to) a target device having similar or the same physical configuration, the target device can function as a duplicate of the device from which the device image was obtained. The operations for generating a device image may be similar to operations described above with respect to FIG. 3 for generating device snapshots as part of region build operations. In addition, each device 504-508 can have a corresponding hardware configuration. The hardware configuration can specify the device's processing, memory, storage, and/or networking capabilities. For example, device 504 may be server device with two central processing units, 32 GB of dynamic memory, and 1 TB of non-volatile (e.g., NVMe) storage, while device 506 may be another server device with four processing units, 64 GB of dynamic memory, and 1 TB of non-volatile storage. The template region 500 can be associated with a hardware configuration that includes that includes the hardware configuration information for all the devices (e.g., device 504-508) in the template region. The hardware configuration information can be stored with the image set 502 and/or combined with the network topology 524 to characterize the devices to which particular device images can be deployed from the image set 502.

The manager service can also determine the network arrangement 516 between devices 504-508. For example, the manager service in conjunction with a network service (e.g., network service 320 of FIG. 3) can store the network configuration corresponding to the network arrangement 516 between the device 504-508. This stored network configuration can be a network topology 524 that specifies the arrangement of each device in the template region 500 to each other device. For example, the network topology 524 can specify that device 504 is the fourth server device on the second rack of server devices and is directly connected to device 506 that is the top of rack network switch for the second rack of server devices. More generally, the network topology 524 can include network identifiers (e.g., network addresses, hostnames, etc.) for the devices 504-508, the current network connections between the devices 504-508, the physical networking interfaces between the devices and the networking infrastructure of a prefab factory, and network settings for the devices (e.g., port configurations, gateway configurations, etc.). The network topology 524 can be used to identify devices to which each device images 510-514 is to be subsequently deployed.

To generate the image set 502 to be agnostic to the target devices when subsequently deploying the device images, the manager service can be configured to anonymize each device image by removing the identifiers 518-522 when generating the device images 510-514. For example, if the template region 500 is built in a prefab factory, device 504 can be associated with identifiers 518 that include resource names identifying the region and realm of the prefab factory. When generating the image, the manager service can remove or modify the region-specific portion of the identifiers 518. In some embodiments, the template region 500 can be built and configured with anonymized identifiers 518-522. For example, a template region can be configured using dummy values for region/realm in the identifiers 518-522 that allow the template region 500 services to function correctly, but can be rotated after the device images are deployed to target physical resources and installed at a destination site.

Figure 6:
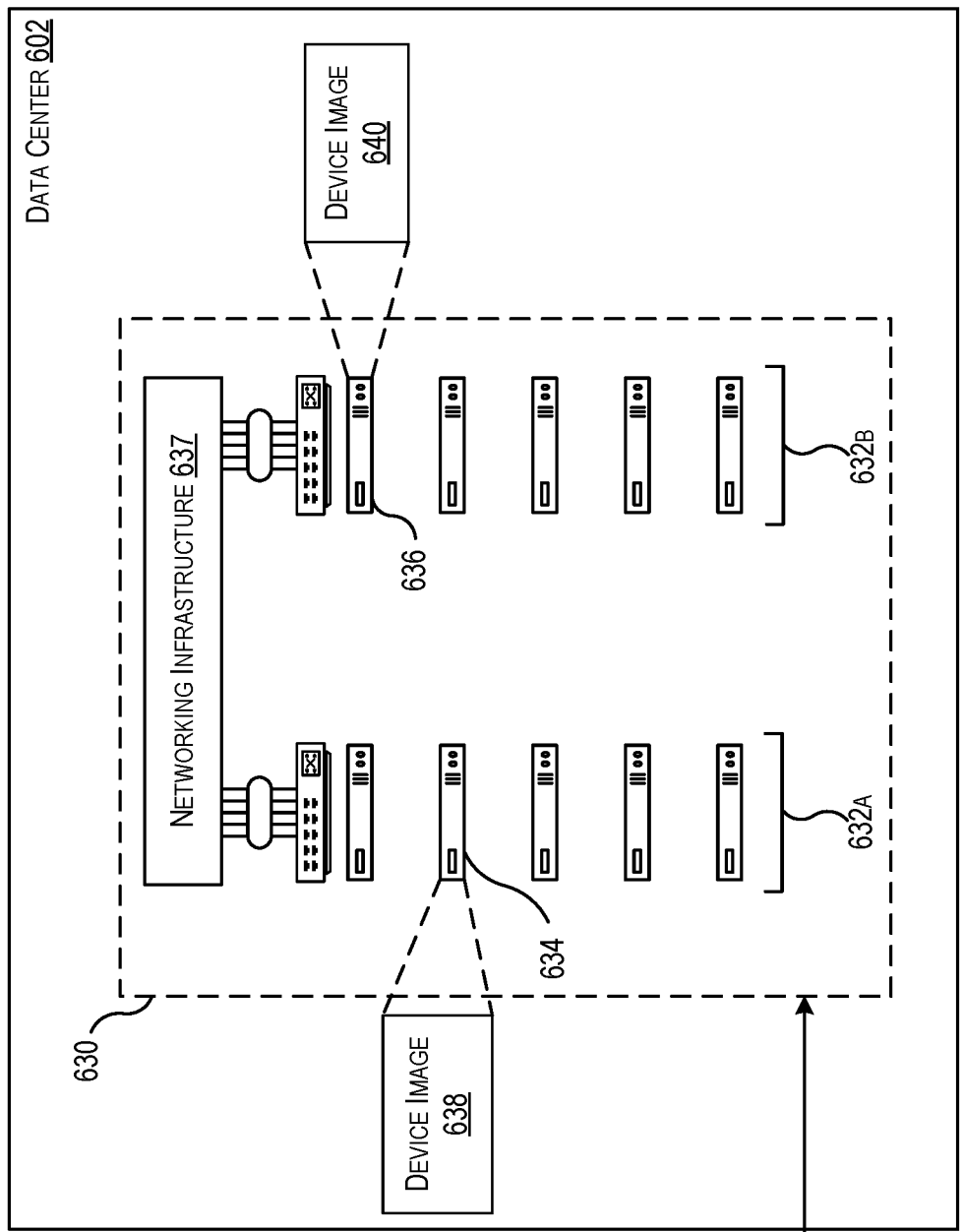
FIG. 6 is a block diagram illustrating an image provisioner to deploy an image set to a region in a data center, according to at least one embodiment.
Figure 6:
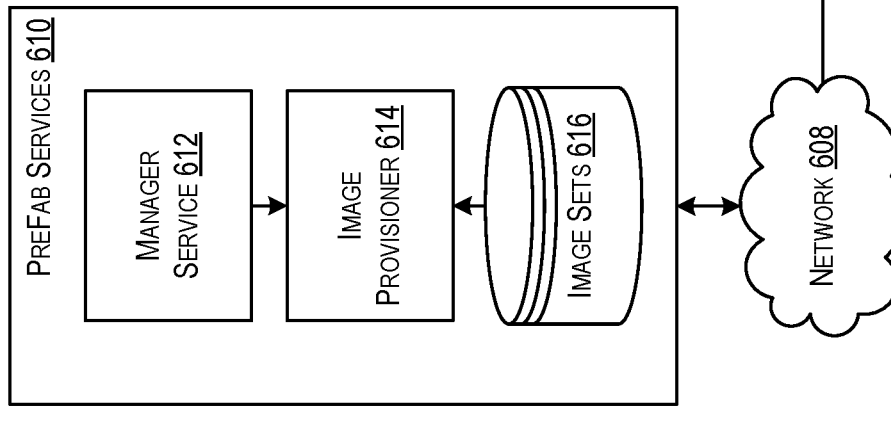

FIG. 6 is a block diagram illustrating an image provisioner 614 to deploy an image set to a region 630 in a data center 602, according to at least one embodiment. The region network 630 may be an example of the prefab region 330 of FIG. 3. Data center 602 may be a facility suitable for hosting region network 630. For example, data center 602 may be an example of prefab factory 302 of FIG. 3. In some embodiments, data center 602 may be a data center of a production region in which the image provisioner may provide the image-based region build operations for physical resources within the region network 630, for example when deploying images to physical resources after those physical resources have been installed at a destination site. The prefab services 610 may be an example of other prefab services described herein, including prefab services 410 of FIG. 4. The prefab services 610 can include a manager service 612. The manager service 612 may be an example of other manager services described herein, including manager service 212 of FIG. 2, and can be configured to orchestrate prefab operations described above as well as obtain and/or generate the device images (e.g., device images 510-514 of FIG. 5) from a template region and coordinate the deployment of those device images to physical resources in the region 630 as described below. The prefab services 610 can be connected to the region network 630 in the data center 602 via a network 608, which may be an example of network 208 of FIG. 2.

As shown in FIG. 6, the region network 630 can be built during prefab region build operations at a data center 602 (e.g., a prefab factory). When using image-based region build techniques, rather than provisioning infrastructure components and deploying software resources individually (as described above with respect to FIGS. 1-4), the manager service 612 can orchestrate the deployment of device-specific images from a an image set to the physical resources in the region 630. Image sets 616 may represent image sets for one or more template regions for deployment to the region 630. For example, image sets 616 can include an image set with device images for each of the devices in server racks 632A and 632B of region 630 as well as an image set for a region with a different number of server racks and devices. The manager service 612 can determine which image set from the image sets 616 to be deployed to the region 630. For example, the manager service 612 can determine a network topology for the region 630 and use the stored network topology (e.g., network topology 524 of FIG. 5) corresponding to the image sets to determine if the topologies are the same or otherwise suitable for deploying the image set. If the topologies are the suitable, then the manager service can select the image set to deploy with the image provisioner. The network topology of the region 630 can include the arrangement of physical resources and their network connections via networking infrastructure 637 in the region 630. For example, a first server device 634 may be the second server device of server rack 632A while a second server device 636 may be the second server device of server rack 632B, as depicted in FIG. 6.

The image provisioner 614 can be configured, in conjunction with the manager service 612, to use the network topology corresponding to the image set to deploy device images to the physical resources of the region 630. For example, the image provisioner 614 can identify a device image 638 corresponding to a first server device 634 of server rack 632 and deploy the device image 638 to the first server device 634. Similarly, the image provisioner 614 can identify a device image 640 corresponding to a second server device 636 in server rack 632B. The image provisioner 614 can then deploy the device image 638 to the first server device 634 and the device image 640 to the second server device 636. Because the first server device 634 and the second server device 636 are part of server rack 632A and server rack 632B, respectively, the device image 638 and device image 640 may not be identical.

Figure 7:
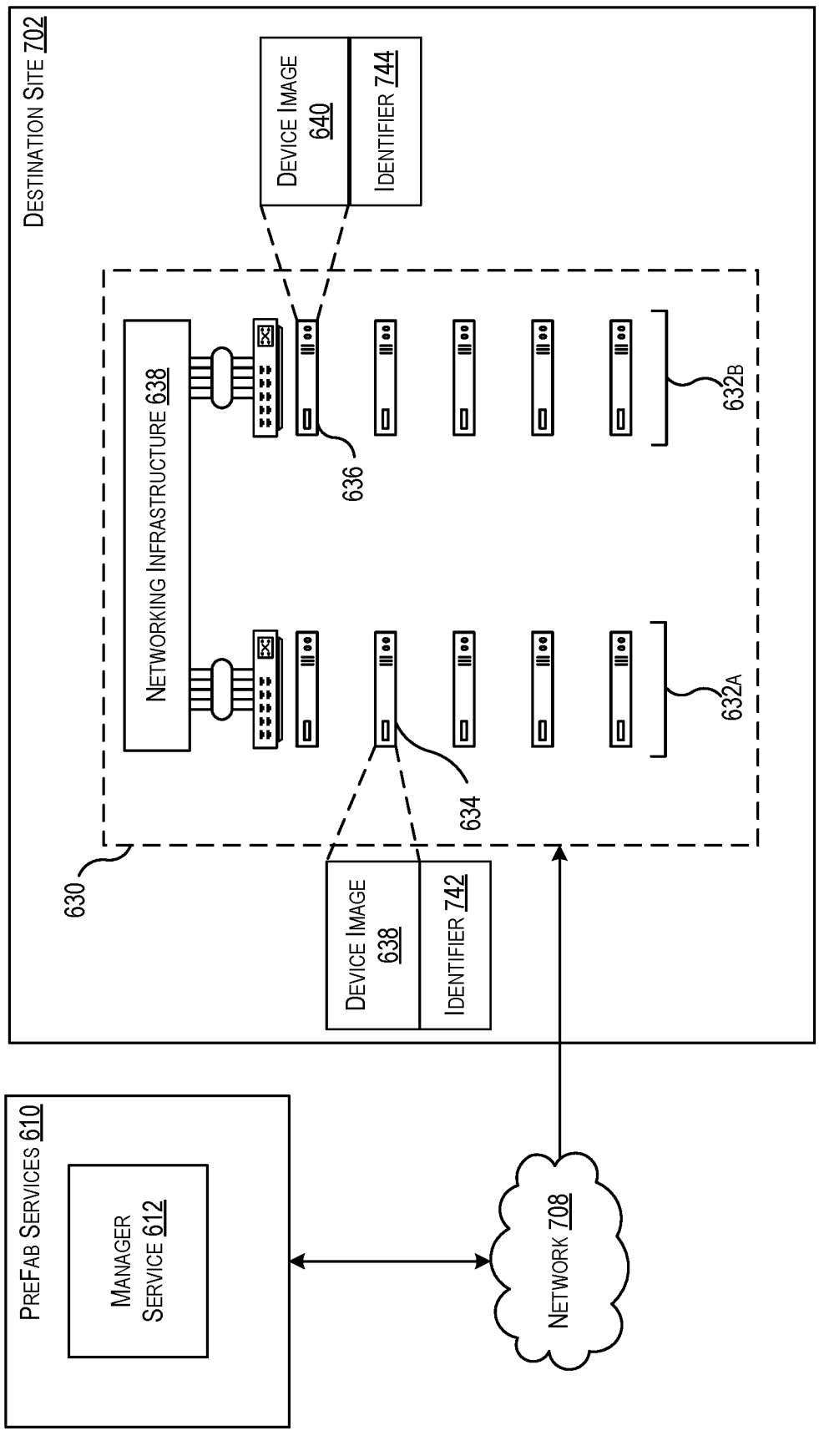
FIG. 7 is a block diagram illustrating deanonymizing region device images after installation at a destination site, according to at least one embodiment.

FIG. 7 is a block diagram illustrating deanonymizing region device images after installation at a destination site 702, according to at least one embodiment. The destination site 702 can be a data center different than the data center 602 in which the image-based region build operations were performed (e.g., a prefab factory). As described briefly above, the manager service 612 can coordinate and perform image deployments for physical resources both in a prefab factory and at a destination site (e.g., destination site 702). Thus, in some examples the physical resources of region 630 can be installed at the destination site 702, the manager service 612 can then deploy device images from an image set to the physical resources (e.g., first server device 634, second server device 636), and then the manager service can deanonymize the device images.

To deanonymize the device images, the manager service 612 can be configured to apply the correct identifiers for each device in the region 630. For example, after the first server device 634 has had device image 638 deployed, the manager service can orchestrate the binding of identifier 742 to the software resources at the first server device 634. Similarly, after the second server device 636 has had device image 640 deployed, the manager service can orchestrate the binding of identifier 744. As described in detail in the related application U.S. application Ser. No. 18/520,510, entitled "TECHNIQUES FOR ROTATING RESOURCE IDENTIFIERS IN PREFAB REGIONS," the identifier 742 and the identifier 744 may be provided to a software resource by a service that can be configured to create, lookup, retrieve, and return the identifiers. This identities service can be configured to support application programming interface ("API") calls to generate the guaranteed unique identifiers using attributes and attribute values associated with the corresponding software resource. The identities service can be configured to use one or more algorithms to generate the identifier. The algorithms can include methods for constructing a namespace string that identifies the software resource as well as methods for hashing the namespace string to produce a hashed identifier. Thus, the manager service 612 can orchestrate the configuration of the software resources in the deployed device images 638, 640 as appropriate (e.g., correct region name, correct realm name, etc.) for the region network 630 at the destination site 702.

Figure 8:
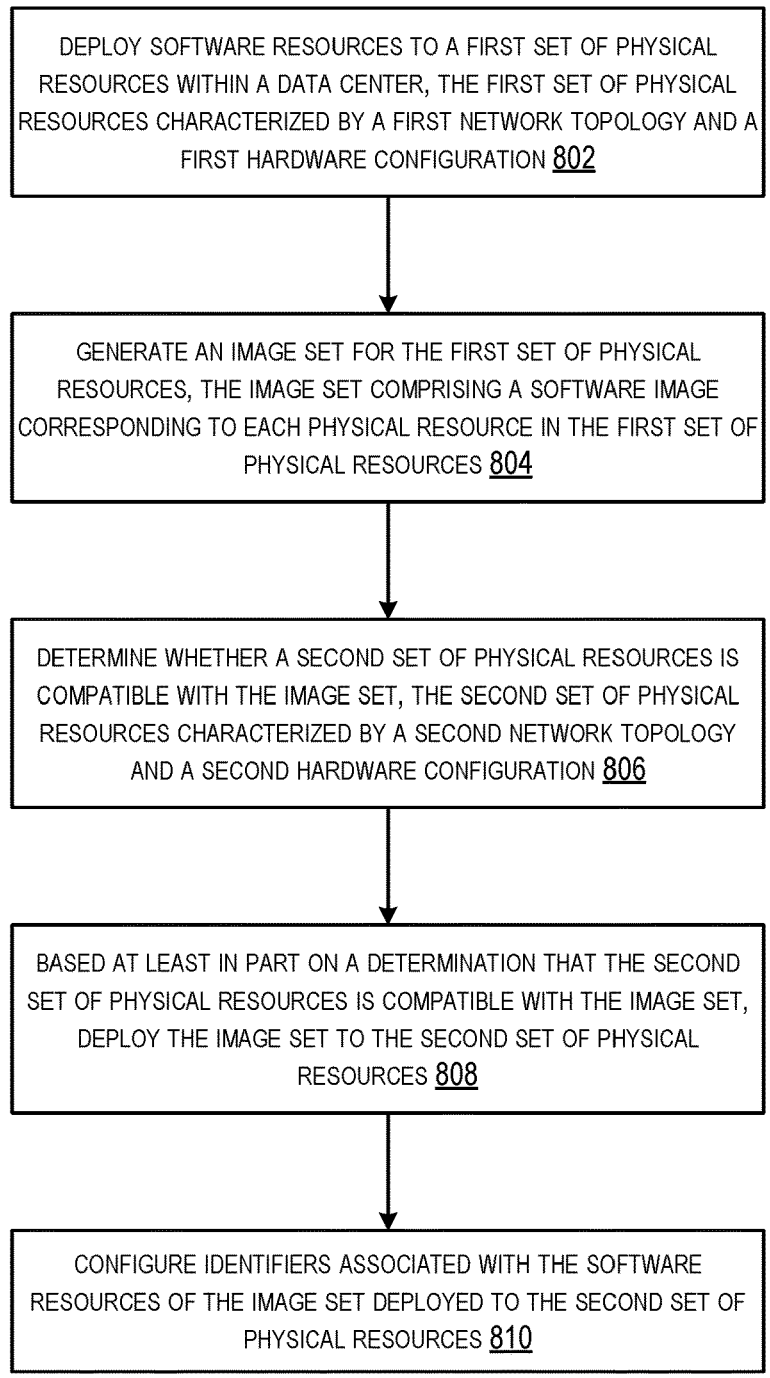
FIG. 8 is a flow diagram of an example process for building an image set for a first set of physical resources and deploying that region set to second set of physical resources, according to at least one embodiment.

FIG. 8 is a flow diagram of an example method 800 for building an image set for a first set of physical resources and deploying that region set to second set of physical resources, according to at least one embodiment. The method 800 may be performed by one or more components of a distributed computing system, including one or more components of a distributed computing system of a CSP (e.g., CSP 204 of FIG. 2) that execute a manager service (e.g., manager service 212 of FIG. 2, manager service 612 of FIG. 6). The operations of method 800 may be performed in any suitable order, and method 800 may include more or fewer operations than those depicted in FIG. 8.

Some or all of the method 800 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The method 800 may begin at block 802, with a manager service deploying software resources to a first set of physical resources within a data center. The first set of physical resources may include devices for a template region used to initially configure software resources for an image set. In some embodiments, the data center may be a prefab factory, in which a template region is built. The first set of physical resources can be characterized by a first network topology and a first hardware configuration. The first network topology can include information specifying the networking arrangement of the physical resources in the first set of physical resources. For example, the network topology can specify that a first server device is located at position two of the fourth server rack of a set of 20 server racks in the template region, and that the first server device is connected to port four of a network switch of the fourth server rack. The first network topology can also include network configuration information for each of the physical resources. In some embodiments, the first network topology can include information specifying a first arrangement of network connections within the first set of physical resources.

The first hardware configuration can include first parameters specifying the hardware capabilities of the first set of physical resources. The first parameters can specify a processor performance, a quantity of dynamic memory, or a storage capacity for each physical resource of the first set of physical resources. For example, the first hardware configuration can specify that the first server device has a certain number and type of processing units, a certain amount of dynamic memory, and a certain amount of non-volatile storage. Deploying software resources to physical resources can occur as described above with respect to FIG. 2.

At block 804, the manager service can generate an image set for the first set of physical resources. The image set can include a software image corresponding to each physical resource in the first set of physical resources. For example, the manager service can obtain a copy of the data stored in the non-volatile storage of each physical resource, which can include the operating system, deployed software resources including services and microservice components that can execute on the physical resource, the state and configuration of VMs on the physical resource, and the like.

At block 806, the manager service can determine whether a second set of physical resources is compatible with the image set. The second set of physical resources can include computing devices and/or networking devices of a target region to be installed at a destination site. The target region may be being built at a prefab factory or similar data center facility. The target region may also be installed at a data center at the destination site. The second set of physical resources can be characterized by a second network topology and a second hardware configuration. The second network topology can include information specifying the networking arrangement of the physical resources in the second set of physical resources. In some embodiments, the second network topology comprises information specifying a second arrangement of network connections within the second set of physical resources.

The second hardware configuration can include second parameters specifying the hardware capabilities of the second set of physical resources. The second parameters can specify a processor performance, a quantity of dynamic memory, or a storage capacity for each physical resource of the second set of physical resources.

At block 808, the manager service can deploy the image set to the second set of physical resources. For example, the manager service can orchestrate an image provisioner service to copy each device image of the image set to a corresponding physical resource of the second set of physical resources. The corresponding physical resource can be determined using the network topology information of the image set. For example, a device image generated from a server device in the second position of the fourth server rack of the first set of physical resources can be deployed to another server device in the second position of the fourth server rack of the second set of physical resources. Deploying the image set to the second set of physical resources can be based in part on the determination that the second set of physical resources is compatible with the image set.

In some embodiments, determining whether the second set of physical resources is compatible with the image set includes determining whether the first network topology identical to the second network topology. For example, the second set of physical resources can include the same number of server devices, networking devices, and server racks as the first set of physical resources, with each server rack having the same number of server devices and each server device connected to the networking devices in the same arrangement.

In some embodiments, determining whether the second set of physical resources is compatible with the image set includes determining whether a first parameter of the first hardware configuration is less than or equal to a second parameter of the second hardware configuration. For example, server devices of the second set of physical resources may have greater non-volatile storage than each server device of the first set of physical resources. Therefore, a device image generated from the first set of physical resources may be suitable to be deployed at the second set of physical resources because the additional non-volatile storage is sufficient to accommodate the device image and function correctly when the corresponding physical resource executes the corresponding software of the device image.

At block 810, the manager service can configure identifiers associated with the software resources of the image set deployed to the second set of physical resources. For example, the manager service can orchestrate an identities rotation for the software resources of the deployed image set by instructing an identities service to generate identifiers for the software resources that correspond to the region, realm, and network of the destination site.

In some embodiments, the image set for the first set of physical resources can be maintained with additional image sets for other sets of physical resources. For example, different template regions may be constructed each having its own network topology and hardware configuration, so that an image set can be built and anonymized for each template region. If the manager service determines that the second set of physical resources is not compatible with the image set, the manager service can select a compatible image set from the additional image sets. The manager service can then deploy the compatible image set to the second set of physical resources.

In some embodiments, prior to generating the image set, the manager service can anonymize the identifiers associated with the software resources of the image set deployed to the first set of physical resources. Anonymizing the identifiers can include replacing the identifiers with dummy identifiers.

In some embodiments, the manger service can deploy updated software resources to the second set of physical resources. Because the image set may have been generated from a template region some time before the deployment of the image set to the second set of physical resources, software resources may have been changed or updated in the interim. The manager service can deploy updated software resources corresponding to the changes (e.g., updated service, updated microservice, updated application) after the second set of physical resources has been configured for its destination site with the suitable identifiers for the destination site network.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 9:
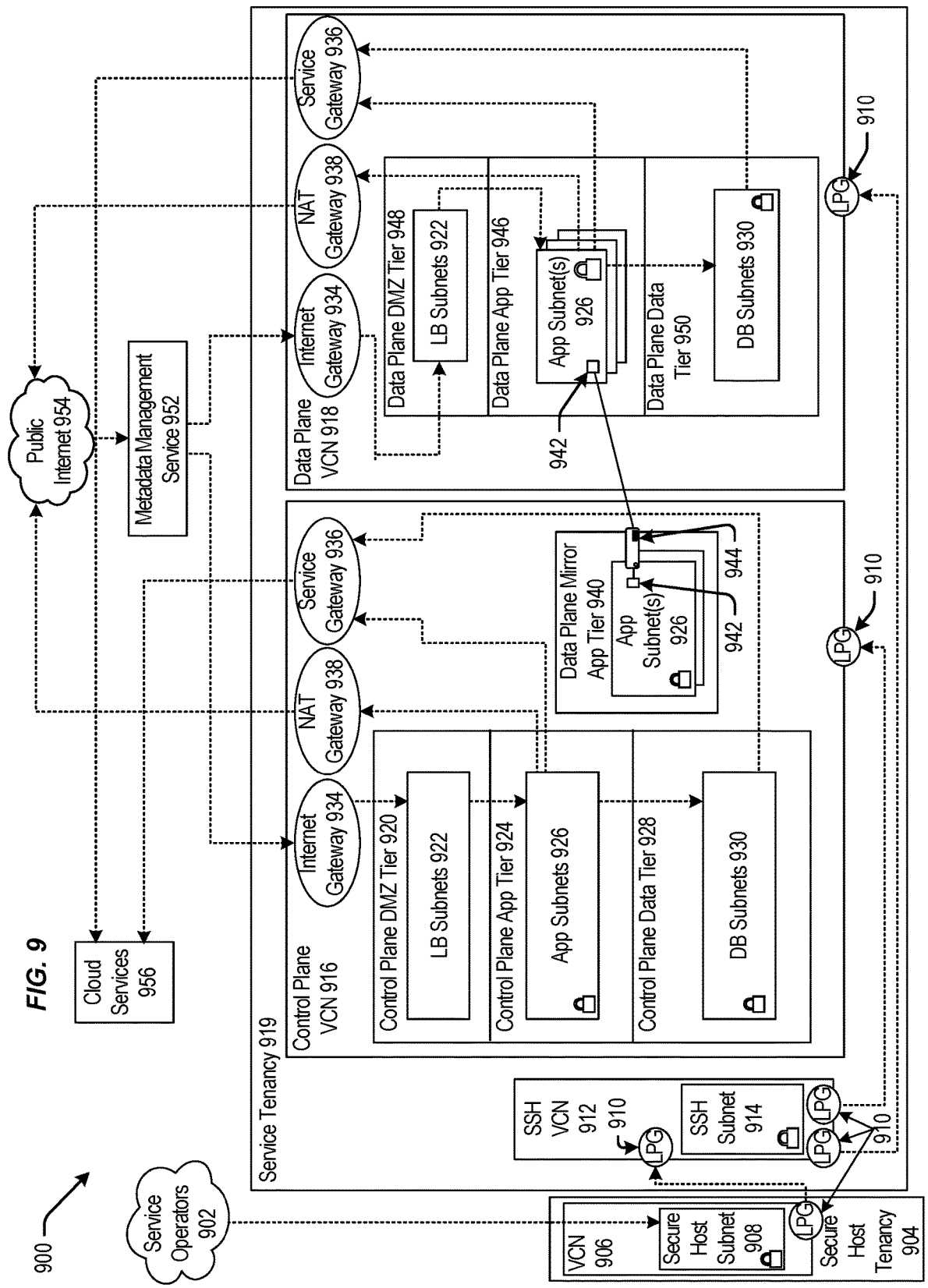
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
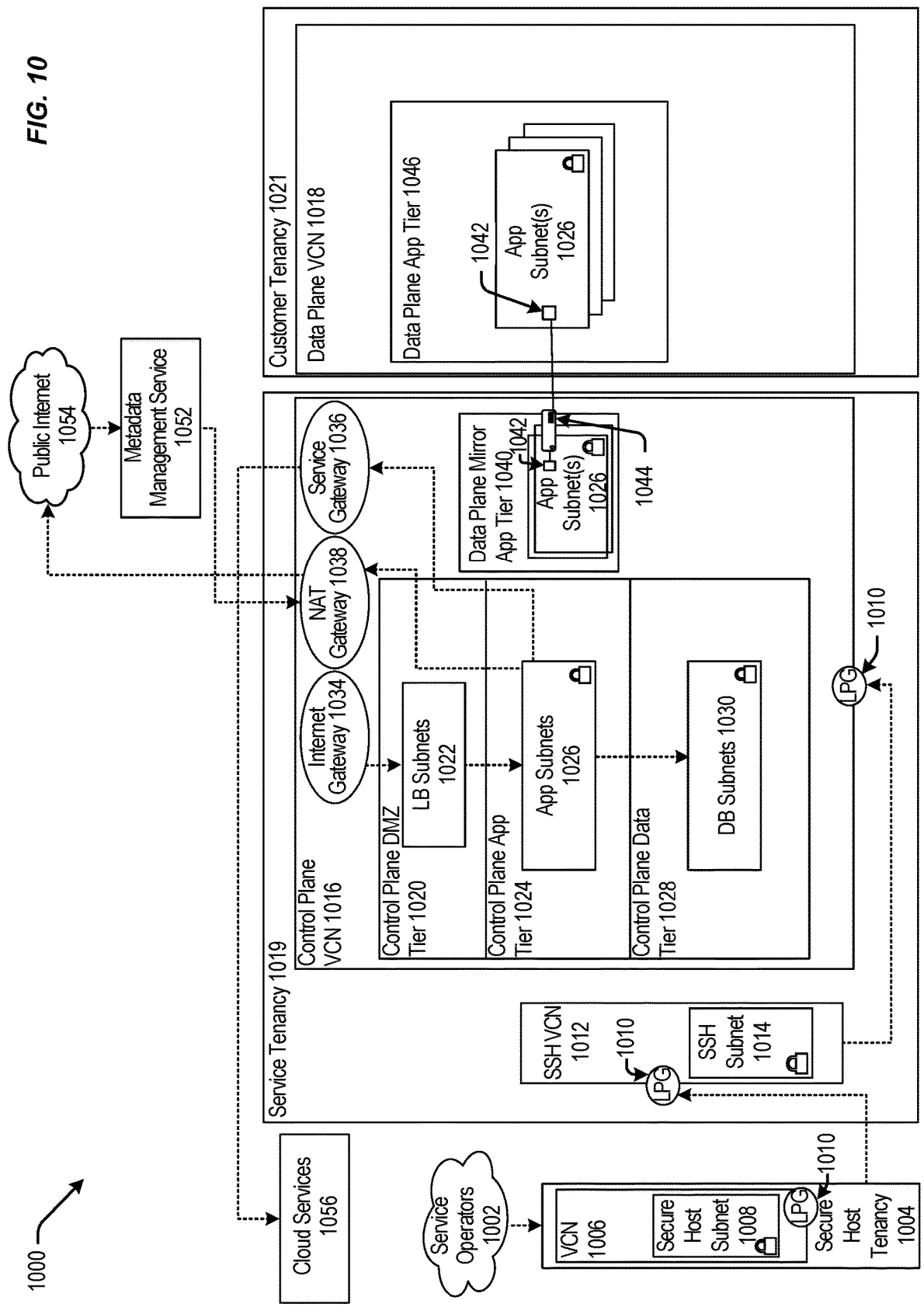
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
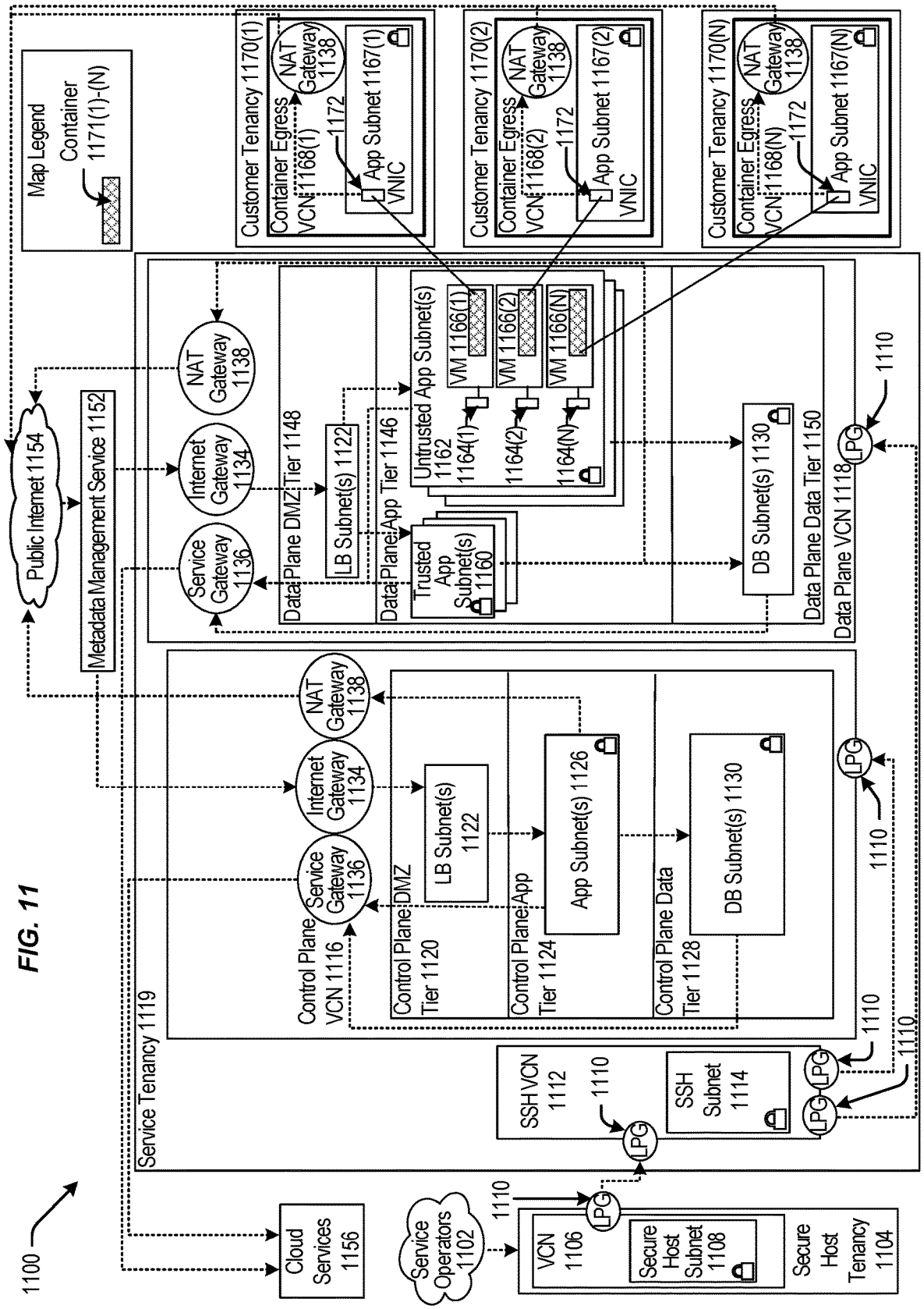
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
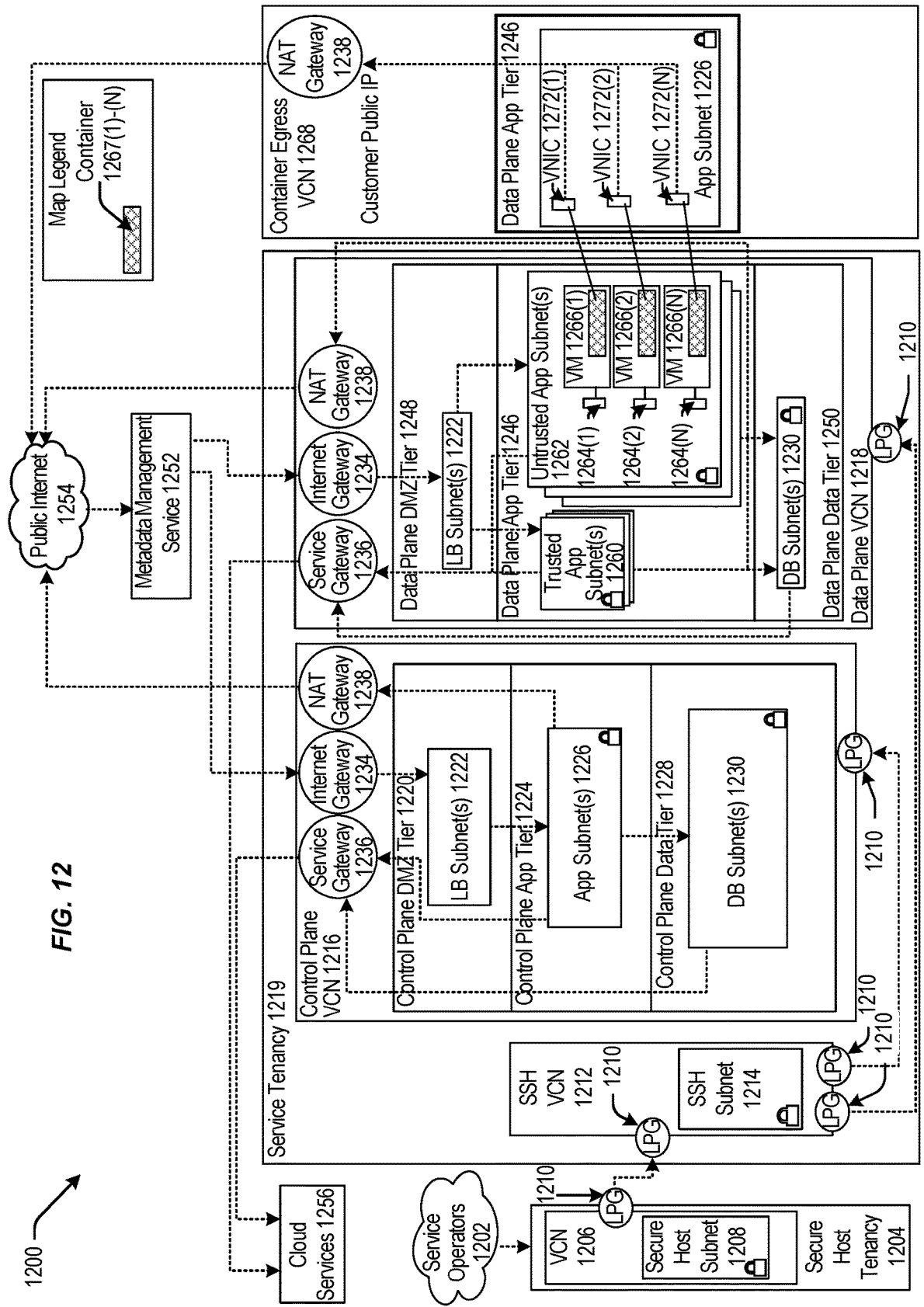
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
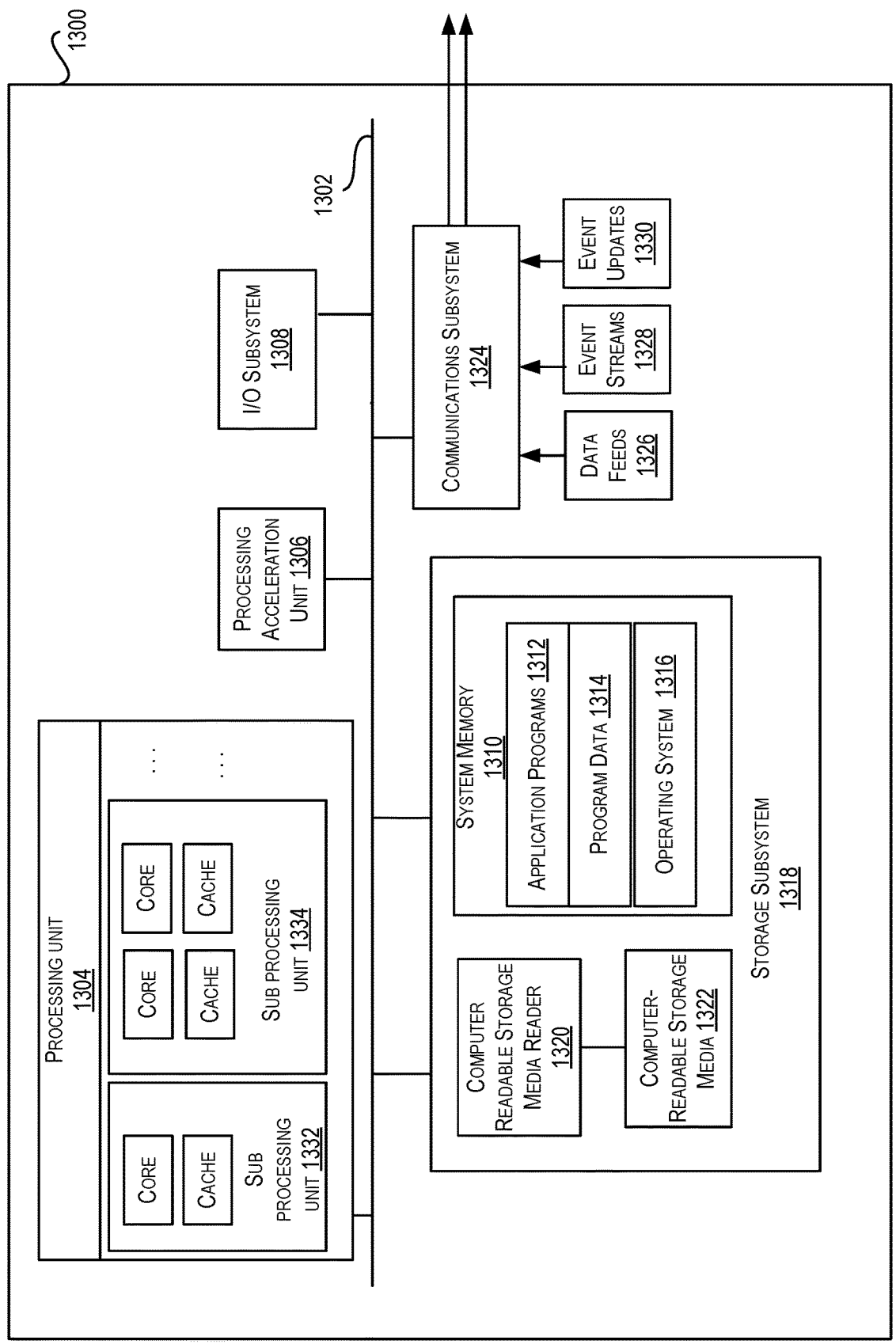
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   deploying, by a manager service, software resources to a first set of physical resources within a data center, the first set of physical resources characterized by a first network topology and a first hardware configuration;
   generating, by the manager service, an image set for the first set of physical resources, the image set comprising a software image corresponding to each physical resource in the first set of physical resources, each software image comprising at least one software resource deployed to the first set of physical resources;
   determining, by the manager service, whether a second set of physical resources is compatible with the image set, the second set of physical resources characterized by a second network topology and a second hardware configuration;
   based at least in part on a determination that the second set of physical resources is compatible with the image set, deploying, by the manager service, the image set to the second set of physical resources; and
   configuring, by the manager service, identifiers associated with the software resources of the image set deployed to the second set of physical resources.

2. The computer-implemented method of claim 1, further comprising:
   maintaining additional image sets for other sets of physical resources;
   based at least in part on a determination that the second set of physical resources is not compatible with the image set, selecting, by the manager service, a compatible image set from the additional image sets; and
   deploying, by the manager service, the compatible image set to the second set of physical resources.

3. The computer-implemented method of claim 1, wherein the network topology comprises information specifying a first arrangement of network connections within the first set of physical resources, and wherein the second network topology comprises information specifying a second arrangement of network connections within the second set of physical resources.

4. The computer-implemented method of claim 3, wherein determining whether the second set of physical resources is compatible with the image set comprises determining whether the first network topology identical to the second network topology.

5. The computer-implemented method of claim 1, wherein the first hardware configuration comprises first parameters specifying a processor performance, a quantity of dynamic memory, or a storage capacity for each physical resource of the first set of physical resources, and wherein the second hardware configuration comprises second parameters specifying a processor performance, a quantity of dynamic memory, or a storage capacity for each physical resource of the second set of physical resources.

6. The computer-implemented method of claim 5, wherein determining whether the second set of physical resources is compatible with the image set comprises determining whether a first parameter of the first hardware configuration is less than or equal to a second parameter of the second hardware configuration.

7. The computer-implemented method of claim 1, further comprising anonymizing, by the manager service prior to generating the image set, the identifiers associated with the software resources of the image set deployed to the first set of physical resources.

8. The computer-implemented method of claim 1, further comprising deploying, by the manager service subsequent to configuring the identifiers, updated software resources to the second set of physical resources.

9. A distributed computing system, comprising:
   one or more processors; and
   one or more memories storing computer-executable instructions that, when executed by the one or more processors, cause the distributed computing system to:
      deploy, by a manager service, software resources to a first set of physical resources within a data center, the first set of physical resources characterized by a first network topology and a first hardware configuration;
      generate, by the manager service, an image set for the first set of physical resources, the image set comprising a software image corresponding to each physical resource in the first set of physical resources, each software image comprising at least one software resource deployed to the first set of physical resources;
      determine, by the manager service, whether a second set of physical resources is compatible with the image set, the second set of physical resources characterized by a second network topology and a second hardware configuration;
      based at least in part on a determination that the second set of physical resources is compatible with the image set, deploy, by the manager service, the image set to the second set of physical resources; and
      configure, by the manager service, identifiers associated with the software resources of the image set deployed to the second set of physical resources.

10. The distributed computing system of claim 9, wherein the one or more memories store additional instructions that, when executed by the one or more processors, cause the distributed computing system to further:
   maintain additional image sets for other sets of physical resources;

based at least in part on a determination that the second set of physical resources is not compatible with the image set, select, by the manager service, a compatible image set from the additional image sets; and deploy, by the manager service, the compatible image set to the second set of physical resources.

11. The distributed computing system of claim 9, wherein the network topology comprises information specifying a first arrangement of network connections within the first set of physical resources, and wherein the second network topology comprises information specifying a second arrangement of network connections within the second set of physical resources.

12. The distributed computing system of claim 11, wherein determining whether the second set of physical resources is compatible with the image set comprises determining whether the first network topology identical to the second network topology.

13. The distributed computing system of claim 9, wherein the first hardware configuration comprises first parameters specifying a processor performance, a quantity of dynamic memory, or a storage capacity for each physical resource of the first set of physical resources, and wherein the second hardware configuration comprises second parameters specifying a processor performance, a quantity of dynamic memory, or a storage capacity for each physical resource of the second set of physical resources.

14. The distributed computing system of claim 13, wherein determining whether the second set of physical resources is compatible with the image set comprises determining whether a first parameter of the first hardware configuration is less than or equal to a second parameter of the second hardware configuration.

15. The distributed computing system of claim 9, wherein the one or more memories store additional instructions that, when executed by the one or more processors, cause the distributed computing system to further anonymize, by the manager service prior to generating the image set, the identifiers associated with the software resources of the image set deployed to the first set of physical resources.

16. The distributed computing system of claim 9, wherein the one or more memories store additional instructions that, when executed by the one or more processors, cause the distributed computing system to further deploy, by the manager service subsequent to configuring the identifiers, updated software resources to the second set of physical resources.

17. A non-transitory computer-readable medium storing computer-executable instructions that, when executed by one or more processors, cause a distributed computing system to:

deploy, by a manager service, software resources to a first set of physical resources within a data center, the first set of physical resources characterized by a first network topology and a first hardware configuration;

generate, by the manager service, an image set for the first set of physical resources, the image set comprising a software image corresponding to each physical resource in the first set of physical resources, each software image comprising at least one software resource deployed to the first set of physical resources;

determine, by the manager service, whether a second set of physical resources is compatible with the image set, the second set of physical resources characterized by a second network topology and a second hardware configuration;

based at least in part on a determination that the second set of physical resources is compatible with the image set, deploy, by the manager service, the image set to the second set of physical resources; and configure, by the manager service, identifiers associated with the software resources of the image set deployed to the second set of physical resources.

18. The non-transitory computer-readable medium of claim 17, storing additional instructions that, when executed by the one or more processors, cause the distributed computing system to further:

maintain additional image sets for other sets of physical resources;

based at least in part on a determination that the second set of physical resources is not compatible with the image set, select, by the manager service, a compatible image set from the additional image sets; and deploy, by the manager service, the compatible image set to the second set of physical resources.

19. The non-transitory computer-readable medium of claim 17, wherein the network topology comprises information specifying a first arrangement of network connections within the first set of physical resources, and wherein the second network topology comprises information specifying a second arrangement of network connections within the second set of physical resources.

20. The non-transitory computer-readable medium of claim 19, wherein determining whether the second set of physical resources is compatible with the image set comprises determining whether the first network topology identical to the second network topology.

* * * * *